Figure 13:
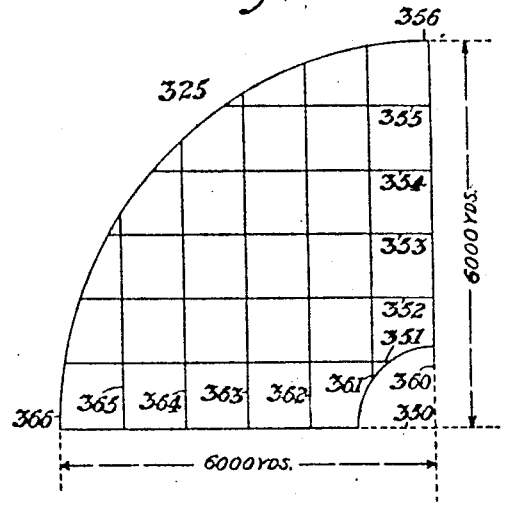

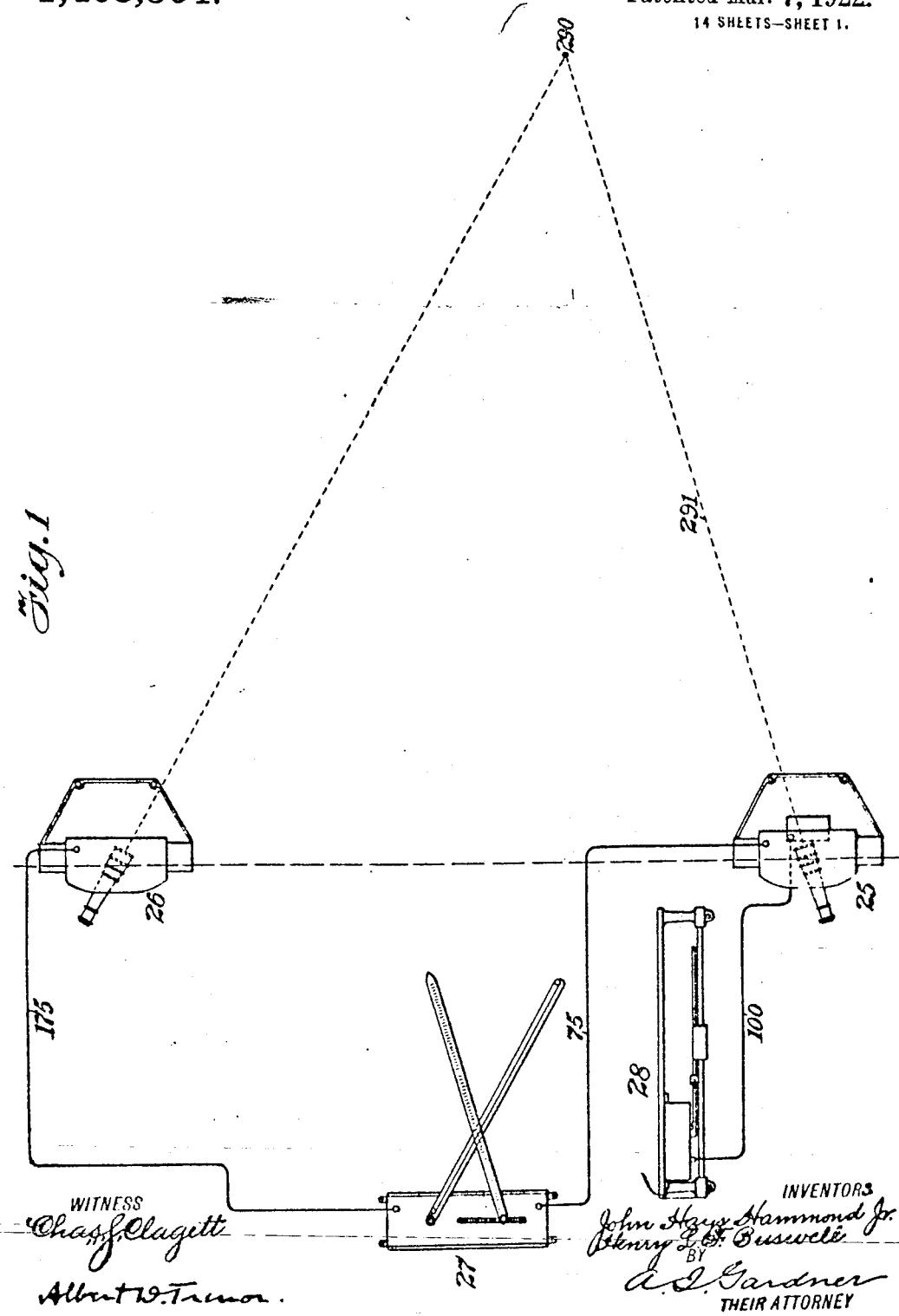

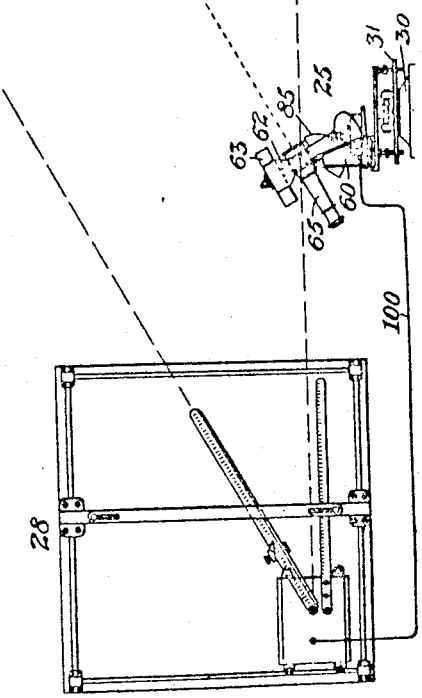

J. H. HAMMOND, Jr., AND H. L. F. BUSWELL.
RANGE FINDER.
APPLICATION FILED JUNE 20, 1916. RENEWED JULY 28, 1921.
1,408,504. Patented Mar. 7, 1922.
14 SHEETS—SHEET 3.
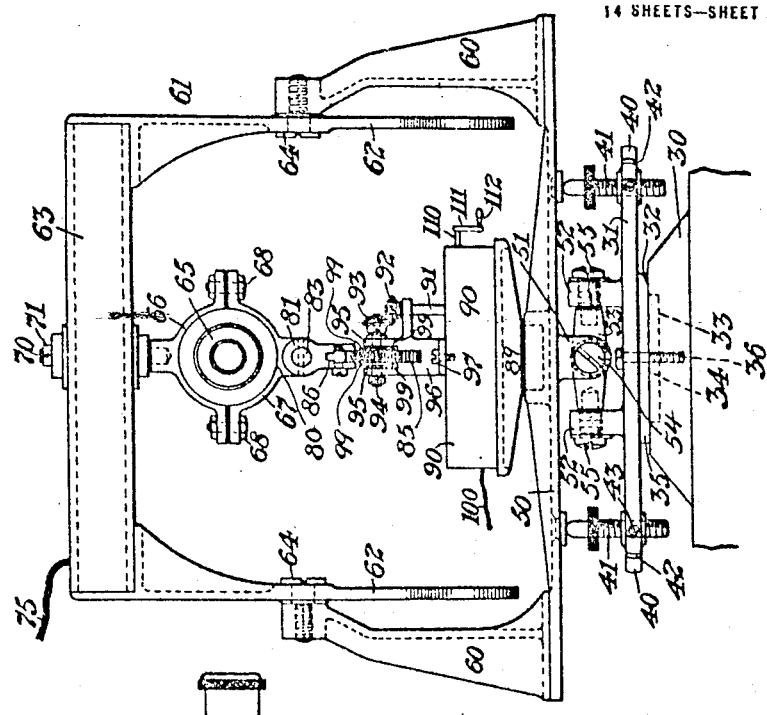
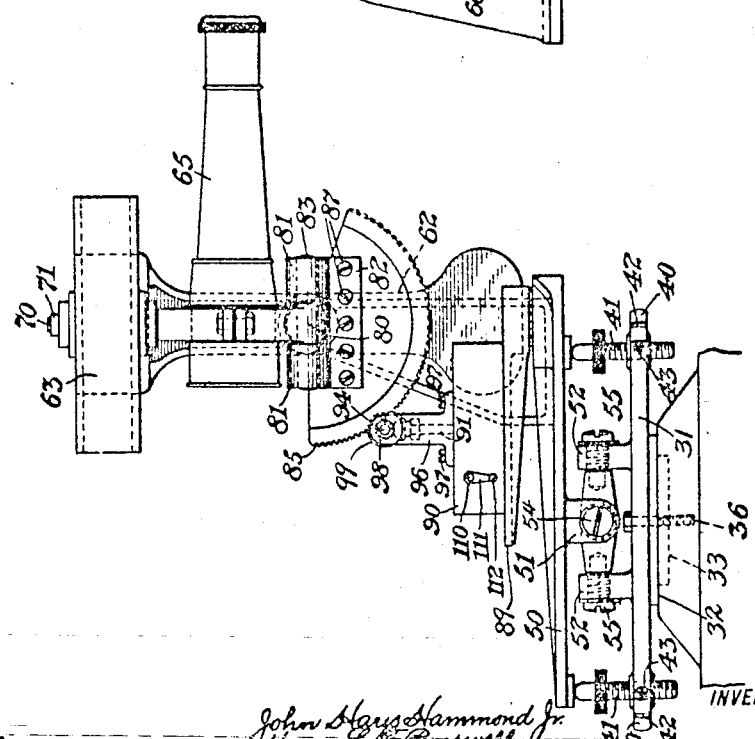

J. H. HAMMOND, Jr., AND H. L. F. BUSWELL.
RANGE FINDER.
APPLICATION FILED JUNE 20, 1916. RENEWED JULY 28, 1921.
1,408,504.
Patented Mar. 7, 1922.
14 SHEETS—SHEET 4.
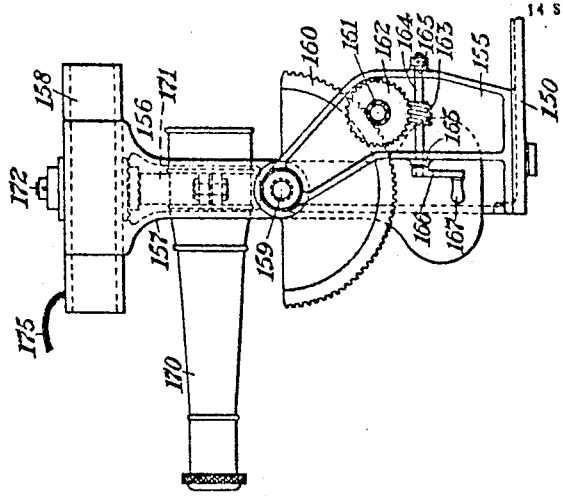
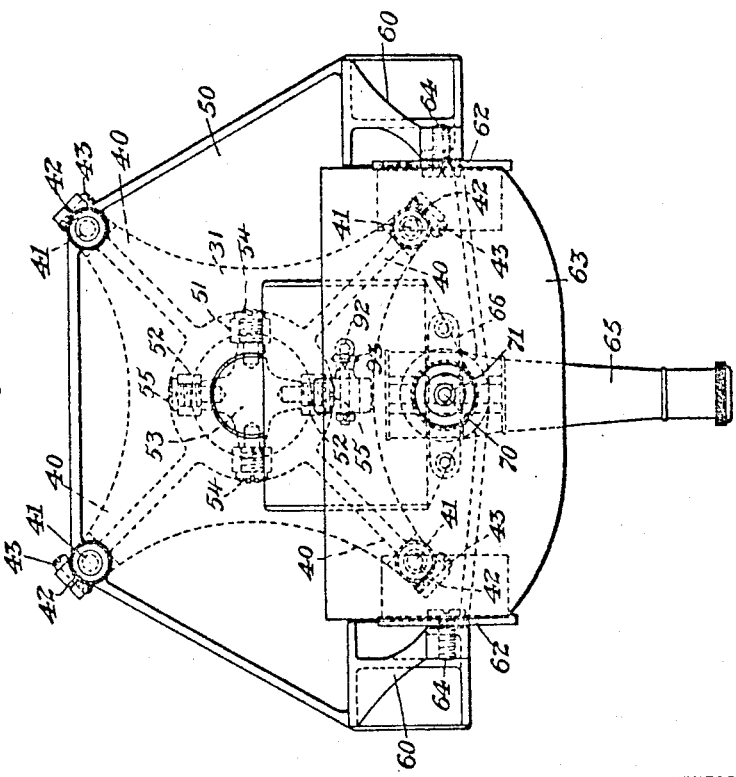

J. H. HAMMOND, Jr., AND H. L. F. BUSWELL.
RANGE FINDER.
APPLICATION FILED JUNE 20, 1916. RENEWED JULY 28, 1921.
1,408,504.
Patented Mar. 7, 1922.
14 SHEETS—SHEET 5.
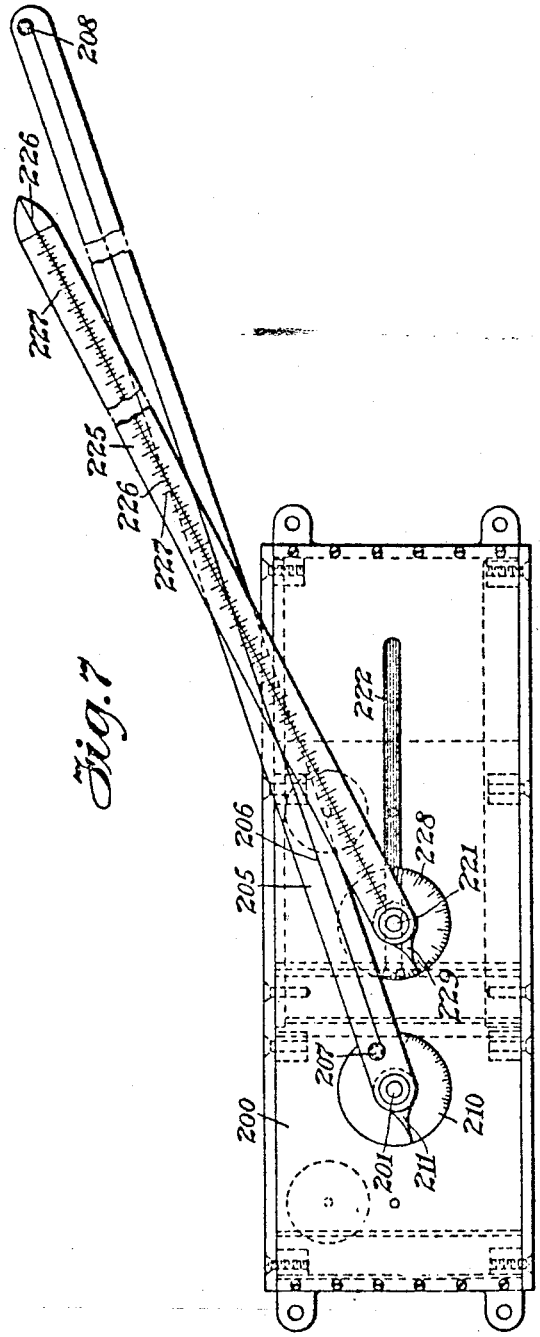
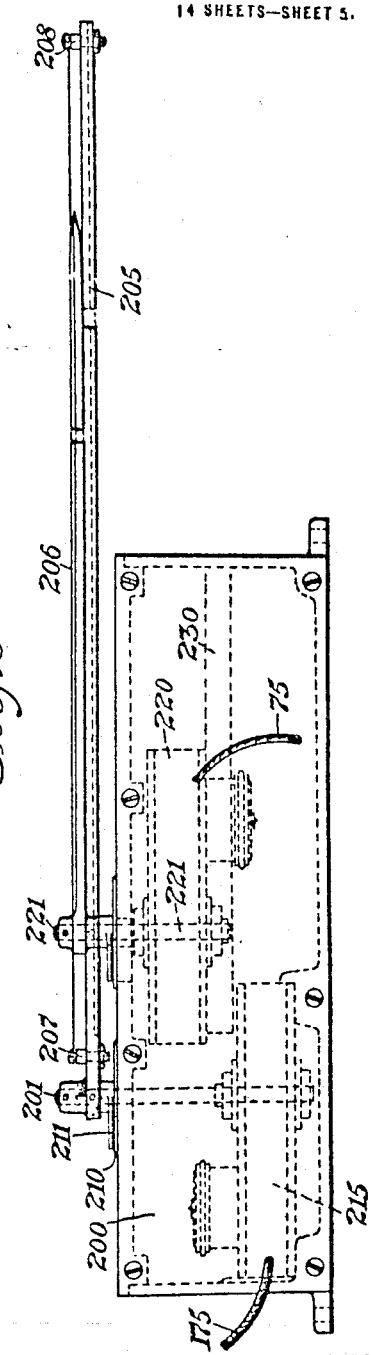

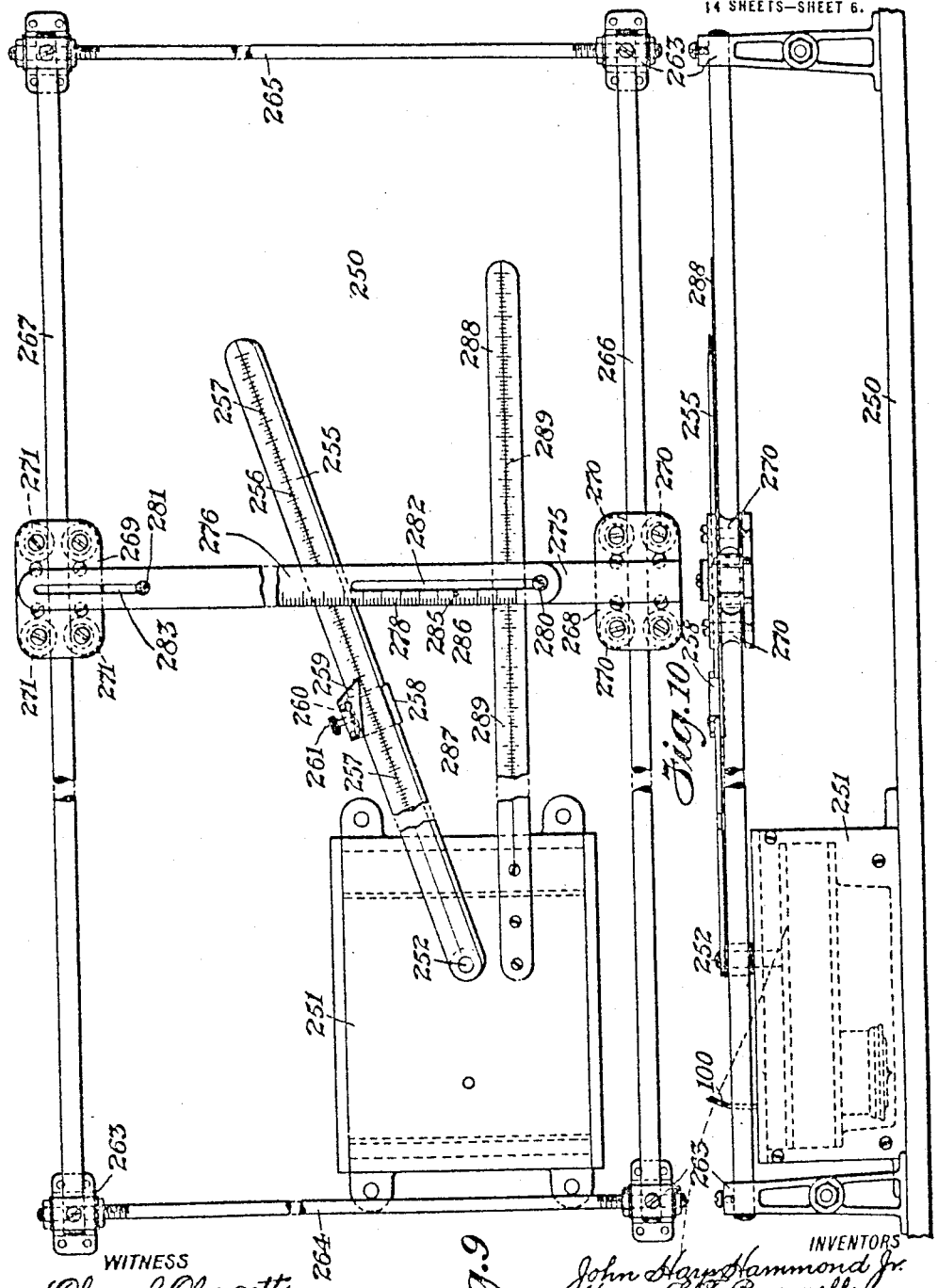

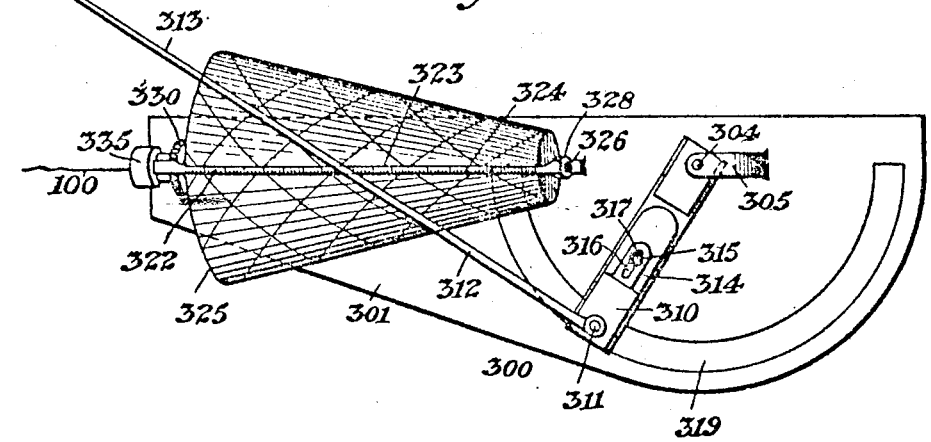
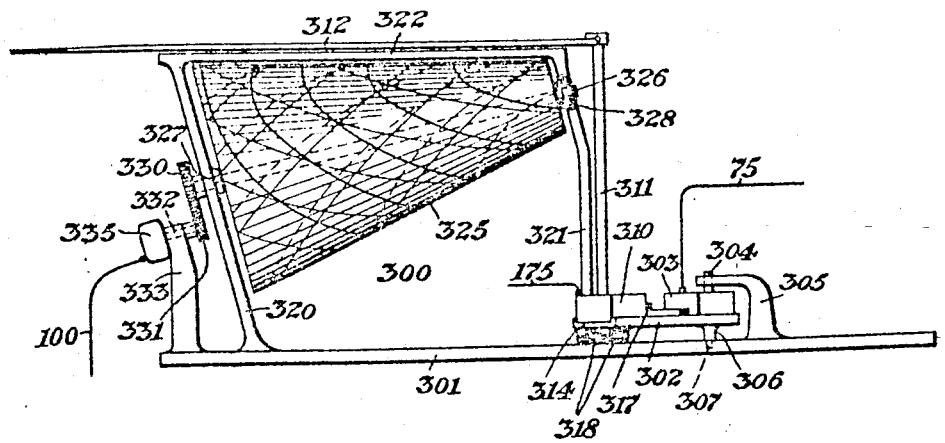

J. H. HAMMOND, Jr., AND H. L. F. BUSWELL.
RANGE FINDER.
APPLICATION FILED JUNE 20, 1916. RENEWED JULY 28, 1921.

1,408,504.  Patented Mar. 7, 1922.
14 SHEETS—SHEET 8.

WITNESS
Chas. J. Clagett
Albert D. Trevor

Inventors
John Hays Hammond Jr.
Henry L. F. Buswell
By their Attorney
A. J. Gardner J. H. HAMMOND, Jr., AND H. L. F. BUSWELL.
RANGE FINDER.
APPLICATION FILED JUNE 20, 1916. RENEWED JULY 28, 1921.

1,408,504.

Patented Mar. 7, 1922.
14 SHEETS—SHEET 11.

J. H. HAMMOND, Jr., AND H. L. F. BUSWELL.
RANGE FINDER.
APPLICATION FILED JUNE 20, 1916. RENEWED JULY 28, 1921.

1,408,504.

Patented Mar. 7, 1922.
14 SHEETS—SHEET 12

WITNESS
Chas. F. Clagett
Albert D. T....

INVENTORS
John Hays Hammond Jr.
Henry L. F. Buswell
BY
A. I. Gardner
THEIR ATTORNEY

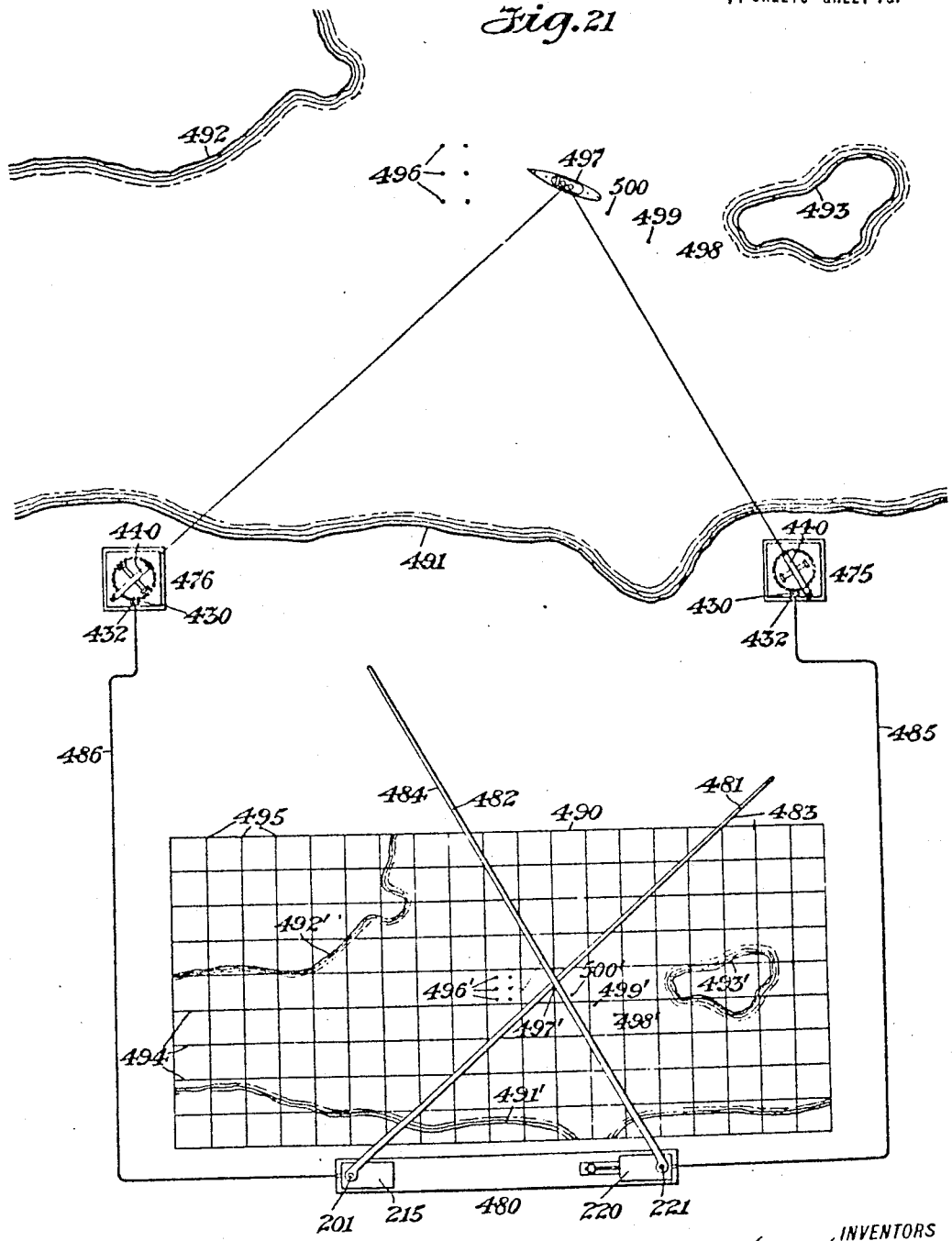

J. H. HAMMOND, Jr., AND H. L. F. BUSWELL.
RANGE FINDER.
APPLICATION FILED JUNE 20, 1916. RENEWED JULY 28, 1921.
1,408,504.
Patented Mar. 7, 1922.
14 SHEETS—SHEET 14.
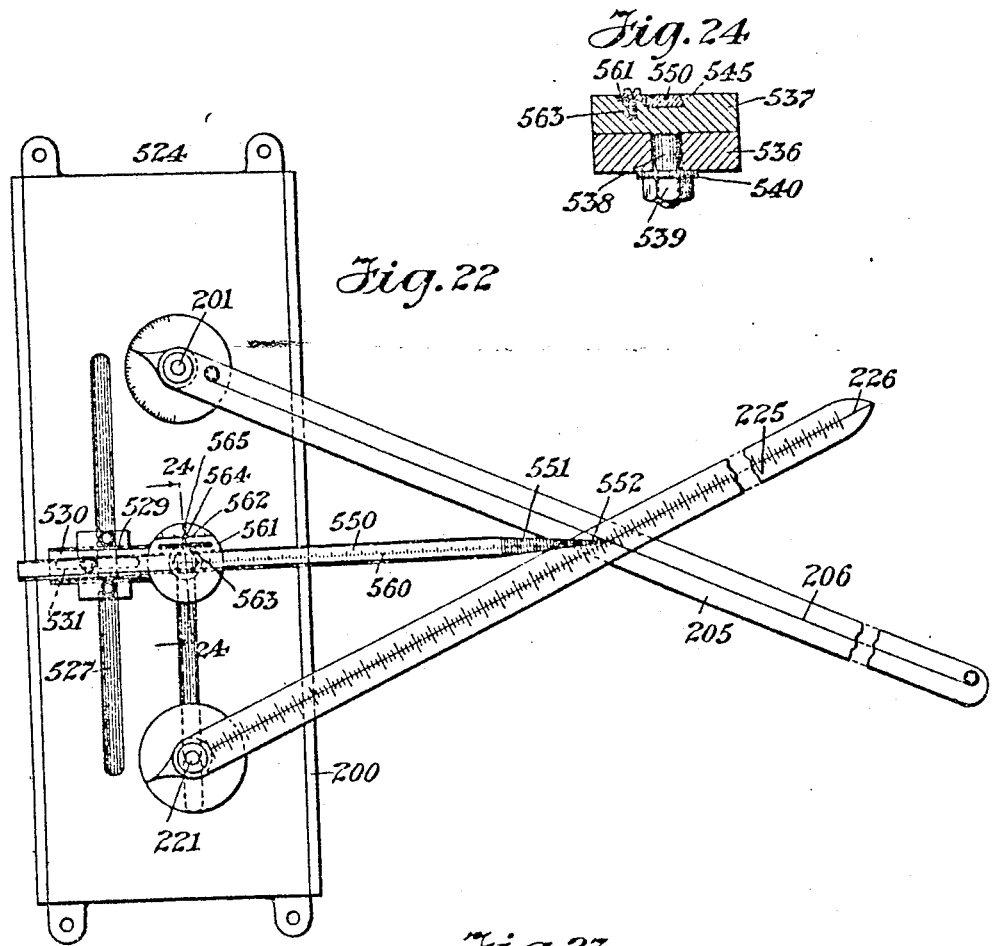
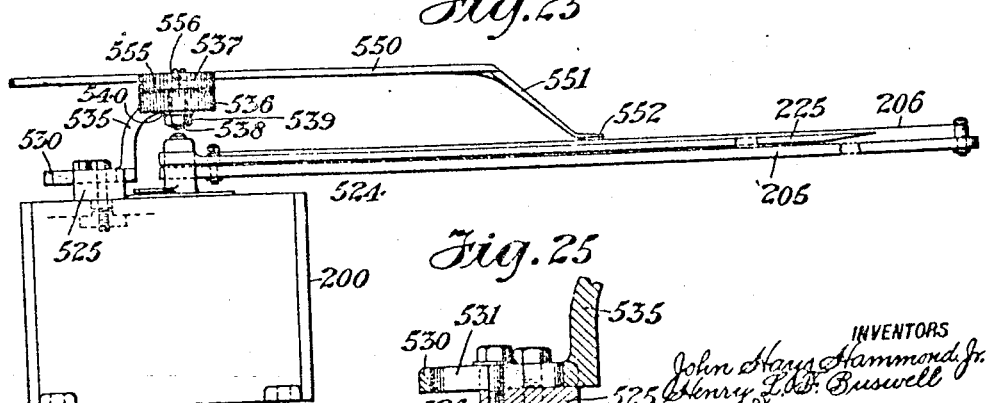

UNITED STATES PATENT OFFICE.

JOHN HAYS HAMMOND, JR., AND HENRY L. F. BUSWELL, OF GLOUCESTER, MASSACHUSETTS; SAID BUSWELL ASSIGNOR TO SAID HAMMOND.

RANGE FINDER.

1,408,504.   Specification of Letters Patent.   Patented Mar. 7, 1922.

Application filed June 20, 1916, Serial No. 104,797. Renewed July 28, 1921. Serial No. 488,151.

*To all whom it may concern:*

Be it known that we, JOHN HAYS HAMMOND, Jr., a citizen of the United States, and a resident of Gloucester, in the county of Essex and State of Massachusetts, and HENRY L. F. BUSWELL, a subject of the King of Great Britain, and a resident of Gloucester, in the county of Essex and State of Massachusetts, have invented certain new and useful Improvements in Range Finders, of which the following is a specification.

Some of the objects of this invention are to provide a range finder particularly adapted to be used in finding the range of air craft; to provide in a range finder improved means operative as a result of the aiming of sighting means upon a target to indicate numerically the range or distance of the target from a given point on the finder; to provide in a range finder means operative to indicate numerically the "elevation" of the target, or the vertical distance between the target and a horizontal plane intersecting the range finder; to provide in a range finder means operative to indicate numerically the horizontal distance between the range finder and an imaginary vertical line drawn through the target; to provide in a range finder means operative to indicate numerically the time of flight of a projectile from a given point on the finder to the target at any given range, the projectile having a predetermined initial velocity; to provide in a range finder means automatically operative to indicate numerically the angle of elevation (measured from the line of sight) required in a gun at a given location to cause its projectile to strike the target, the projectile having a predetermined initial velocity and the gun being aimed in a suitable vertical plane; to provide in a range finder means automatically operative to indicate simultaneously a plurality of the foregoing numerical results; and to provide other improvements as will appear hereinafter.

Figure 14:
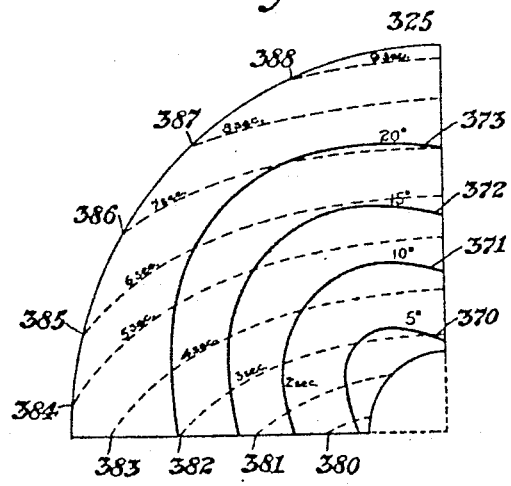
Figure 15:
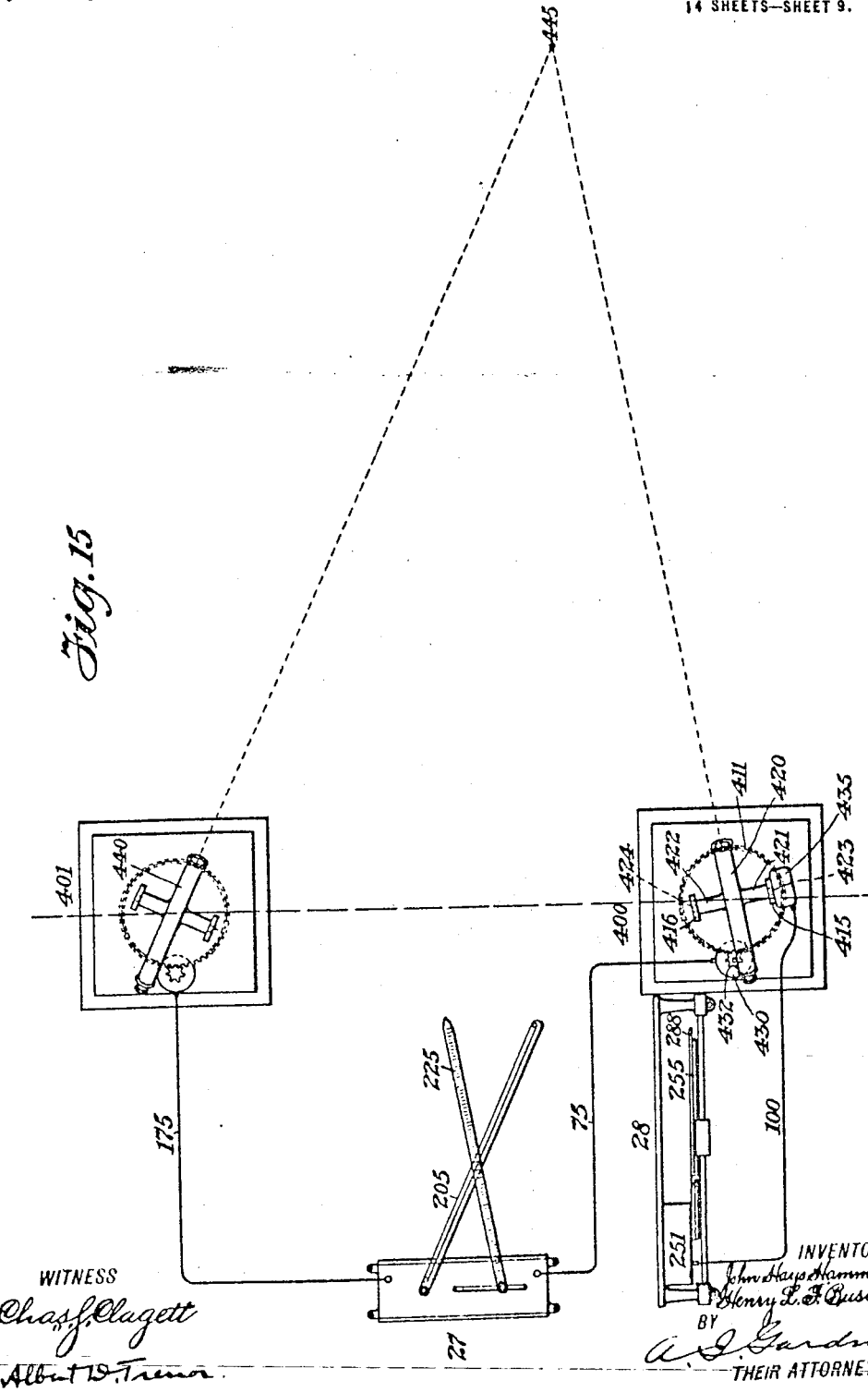
Figure 16:
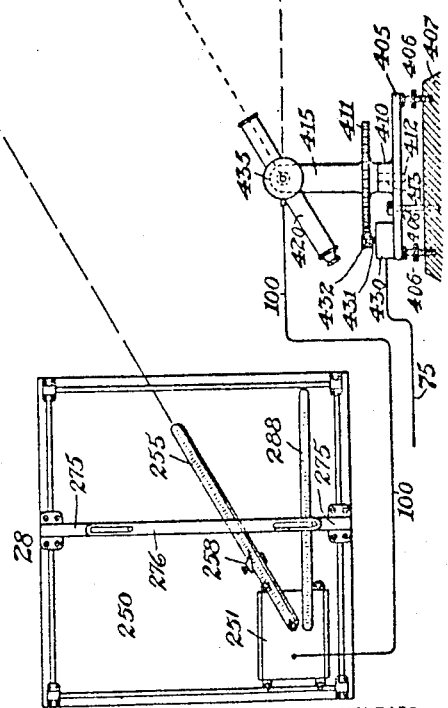
Figure 17:
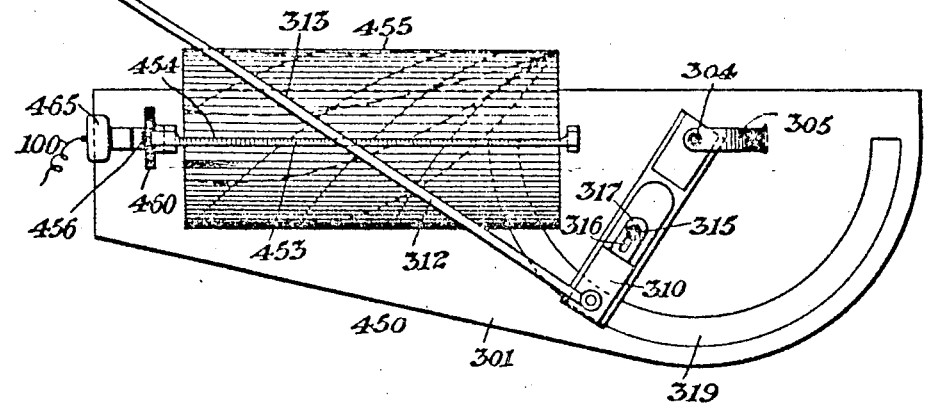
Figure 18:
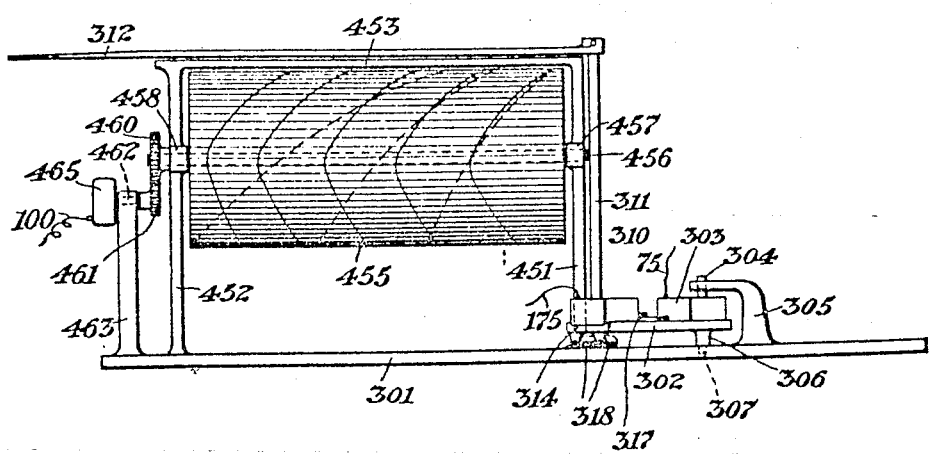
Figure 19:
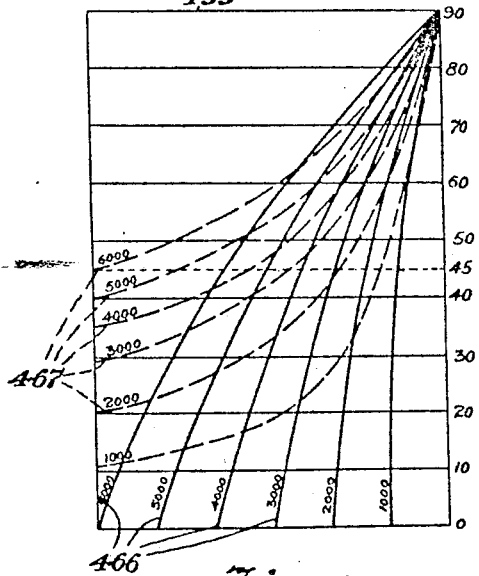
Figure 20:
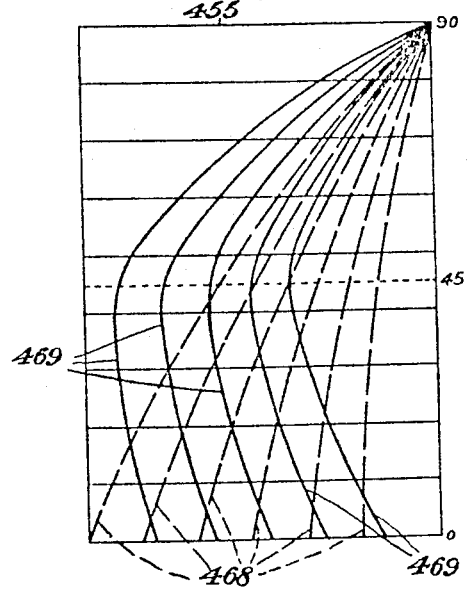

In the accompanying drawings, Fig. 1 is a diagrammatic top plan view of a range finder constructed in accordance with this invention; Fig. 2 a side elevation of the same; Figs. 3, 4 and 5 are a side elevation, a rear elevation and a top plan view respectively of one of the sighting or aiming units (referred to hereinafter as the main sighting unit) forming a part of this invention; Fig. 6 is a side elevation of another sighting unit (referred to hereinafter as the auxiliary or secondary sighting or aiming unit) forming a part of this invention; Figs. 7 and 8 are a top plan view and a side elevation respectively of a distance indicator (referred to hereinafter as the main distance indicator) forming a part of this invention; Figs. 9 and 10 are a side elevation and a top plan view respectively of a distance indicator (referred to hereinafter as the secondary or auxiliary distance indicator) forming a part of this invention; Figs. 11 and 12 are a top plan view and a side elevation respectively of a modified form of indicator constructed in accordance with this invention; Figs. 13 and 14 are plan views showing developments of a truncated cone forming a feature of the modified form of indicator shown in Figs. 11 and 12; Figs. 15 and 16 are a top plan view and a side elevation respectively of another form of this invention; Figs. 17 and 18 are a top plan view and a side elevation respectively of a modified form of indicating device forming a part of this invention; Figs. 19 and 20 are developments of a cylinder forming a part of the device shown in Figs. 17 and 18; Fig. 21 is a diagrammatic plan view of a further modified form of this invention; Figs. 22 and 23 are a top plan view and a side elevation respectively of a further modified form of indicating device forming a part of this invention; Fig. 24 is an enlarged transverse section on line 24—24 of Fig. 22; and Fig. 25 is an enlarged fragmentary transverse vertical section of a part of the device shown in Figs. 22 and 23.

Referring to the drawings, and more particularly to Figs. 1 and 2, one embodiment of this invention comprises a range finder including a main sighting or aiming unit 25, a secondary or auxiliary sighting or aiming unit 26, a main distance indicator 27, and a secondary or auxiliary distance indicator 28.

The main sighting or aiming unit 25 comprises (see Figs. 1, 3, 4 and 5) a rigid stationary sub-base 30 upon which a rigid rotary spider or support 31 is mounted to rotate about a fixed substantially vertical axis, the sub-base having a flat substantially horizontal top surface 32 provided with a circular recess 33, and the spider 31 being provided with a circular boss 34 integral therewith which fits snugly but rotatably in the circular recess 33, and the spider 31 being also provided with a flat annular shoulder 35 coaxial with the boss 34 and which rests slidably upon the flat top surface 32 of the sub-base 30. A bolt 36 extends loosely and axially through the spider 31 and is threaded into the base 30 to clamp the spider fixedly in any desired position of adjustment upon the base 30. The spider 31 comprises four arms 40 through which are threaded respectively four vertical adjusting screws 41, and the outer ends of the arms 40 are split as at 42 and provided with clamping screws 43 operative to clamp the vertical adjusting screws 41 fixedly in any desired positions of adjustment.

An adjustable normally horizontal base plate 50 rests upon the upper ends of the vertical adjusting screws 41, and is connected to the spider 31 by a universal joint comprising a pair of oppositely disposed lugs 51 integral with and projecting downwardly from the base plate 50, a pair of lugs 52 integral with the spider 31 and projecting upwardly therefrom, an intermediate element 53, and two pairs of screws 54, 54 and 55, 55 threaded through the lugs 51, 51 and 52, 52 respectively, and pivotally connecting the lugs to the intermediate element 53, the base plate 50 being thus connected to the spider 31 and rotatively adjustable with respect to the spider 31 about two axes intersecting at right angles and fixed with respect to the base plate 50 and parallel thereto.

Rigid with and projecting upwardly from the base plate 50 are a pair of standards 60, between which is arranged a yoke 61 comprising two upwardly extending rigid arms 62 and a rigid hollow casing 63 extending between and fixedly secured to the upper ends of the arms 62. The yoke 61 is pivotally connected to the standards 60 by means of two oppositely disposed horizontally alined screws 64 extending loosely through the central portions of the arms 62 and threaded into the upper ends of the standards 60, thus supporting the yoke 61 to swing with respect to the standards 60 about a horizontal axis fixed with respect to the standards 60. The lower portions of the arms 62 of the yoke are enlarged to provide flat counterweights to which other counterweights may be secured if necessary for balancing the yoke and the parts carried thereby about the horizontal axis of oscillation of the yoke.

A main telescope 65, or other sighting or aiming device is arranged within the yoke 61 and is clamped securely between the upper part 66 and the lower part 67 of a split ring or collar by means of two bolts 68. The upper portion 66 of the split ring is fixedly secured to the lower end of an upwardly extending spindle 70 which extends rotatably through the casing 63 and which is held against downward movement with respect to the casing 63 by means of a collar 71 fixedly secured to the upper end of the spindle 70. The spindle 70 is mounted in suitable bearings provided therefor in the casing 63 to rotate with respect to the casing 63 about an axis fixed with respect thereto and intersecting and always perpendicular to the horizontal axis of oscillation of the yoke 61. The spindle 70 is operatively connected to any well known or suitable electric motion transmission means (not shown) arranged within the casing 63 and connected by a suitable cable 75 of electric conductors to the main distance indicator 27, as will appear hereinafter.

For transmitting the angular movement of the main telescope 65 as measured by the variation in the angle between the longitudinal axis or line of sight of the telescope and the projection of this line of sight upon a horizontal plane, the lower portion 67 of the split ring is provided with a downwardly projecting lug 80 rigid therewith, which engages slidably between two outer lugs 81 which project upwardly from and are rigid with a plate 82. The downwardly depending lug 80 is pivotally connected to the upwardly extending lugs 81 by means of a cylindrical pivot or pintle 83 which fits tightly through an aperture provided therefor in the downwardly depending lug 80 and snugly but rotatably through apertures provided therefor in the upwardly extending lugs 81, the lugs 80 and 81 and the pintle 83 thus forming a hinge. The pintle 83 is so arranged that its longitudinal axis passes at all times through the point of intersection of the horizontal axis of oscillation of the yoke 61 and the longitudinal axis of the spindle 70, and is at all times perpendicular to both the horizontal axis of oscillation of the yoke 61 and the longitudinal axis of the spindle 70. Rigidly secured to and depending downwardly from the plate 82 in a vertical plane is a segmental gear 85, the upper portion of the gear being tightly arranged in a slot 86 provided therefor in the lower edge of the plate 82, and being clamped securely in position therein by means of screws 87 extending through the plate 82 and through the segmental gear 85. The segmental gear 85 is thus hinged or pivotally connected to the telescope to permit the segmental gear to be maintained always in a vertical plane with its central plane including the longitudinal axis of the pintle 83 as will appear hereinafter. Arranged beneath the segmental gear 85 and mounted upon the adjustable base plate 50 to rotate with respect thereto about a fixed vertical axis intersecting the horizontal axis of oscillation of the yoke 61 is a rigid bracket 89 upon which is fixedly secured a hollow casing 90 containing any well known or suitable electric motion transmission means (not shown) arranged to be actuated by a vertical spindle 91 projecting upwardly from the casing 90 and arranged to rotate with respect thereto about a fixed axis. Rigidly secured to the upper end of the spindle 91 is a bevel pinion 92 which is engaged by a bevel pinion 93 rigidly secured to one end of a horizontal shaft 94 which extends snugly but rotatively through two spaced bearings 95 which are rigid with and project upwardly from a rigid standard 96 which is rigidly secured to the upper side of the casing 90 by means of screws 97. Arranged between the spaced bearings 95 and surrounding and fixedly secured to the shaft 94 is a pinion 98 which engages the segmental gear 85. Also surrounding the shaft 94 and fixedly secured thereto and arranged upon opposite sides of and secured to the pinion 98 are two flat circular discs or collars 99 which slidably engage the opposite sides of the segmental gear 85 and hold the segmental gear 85 always in a vertical plane and in engagement with the pinion 87. The electric transmission means in the casing 90 is connected by a suitable electric cable 100 to the secondary distance indicator 28, as will appear hereinafter.

Any suitable means may be provided for rotating the yoke 61 and the telescope 65 carried thereby about the horizontal axis of oscillation of the yoke 61. In the form of this invention shown in Figs. 3, 4 and 5 there is provided for this purpose a horizontal rotary shaft 110 which projects outwardly through the casing 90 and which is provided outside of the casing with a crank arm 111 rigidly secured thereto and provided with a handle 112 whereby the shaft 110 may be rotated, and which is operatively connected within the casing 90 to the electrical transmission mechanism (not shown) to actuate the same and thereby to rotate the shaft 91, thus causing the rotation of the gear 85 about a variable horizontal axis.

The secondary sighting or aiming unit 26 is constructed in a manner similar to that just described for the primary sighting or aiming unit 25, except that in this secondary sighting unit 26 the parts numbered from 80 to 110 for transmitting the angular movement of the line of sight of the main telescope 65 with respect to its projection on a horizontal plane are omitted, and also instead of the hereinbefore described shaft 110, crank arm 111 and handle 112, other parts are substituted as will appear hereinafter for swinging the telescope about its horizontal axis. This secondary sighting or aiming unit comprises a stationary base plate 150 which is adjustably mounted upon and rigidly clamped to a fixed sub-base, as hereinbefore described in connection with the main telescope 65. Rigidly secured to and projecting upwardly from the base plate 150 are a pair of spaced rigid brackets or standards 155, between which is arranged to oscillate a yoke 156, comprising a pair of upwardly extending arms 157 and a hollow substantially horizontal casing 158 connecting and rigidly secured to the upper ends of the arms 157. Extending loosely through the central portions of these arms 157 respectively are two outwardly projecting horizontally alined screws 159 which are threaded securely into the upper ends of the brackets 155 respectively and which support the yoke 156 to oscillate about a horizontal axis coincident with the longitudinal axes of the screws 159. Rigidly secured to one of the arms 157 and arranged coaxially with the horizontal axis of oscillation of the yoke 156 is a segmental gear 160 which is engaged by a pinion 161 arranged to rotate about a fixed horizontal axis and to actuate a worm gear 162 arranged coaxilly therewith. The worm gear 162 is engaged by a worm 163 fixed upon a horizontal shaft 164 which is terminally supported in bearings 165 provided therefor in the corresponding bracket 155, and secured to one end of the shaft 164 is a crank 166 having a handle 167 whereby the worm 163 may be rotated to rotate the segmental gear 160 and to swing the yoke 156 about its horizontal axis of oscillation. Arranged within the yoke 156 is a telescope 170 or other sighting or aiming device which is securely mounted in a split ring 171 which depends from and is rigid with a shaft 172 which extends upwardly through the hollow casing 158. Arranged within the hollow casing 158 is any well known or suitable electric transmission means (not shown) which is connected by a cable 175 to the main distance indicating device 27 to transmit the rotary motion of the telescope 170 about the longtudinal axis of the shaft 172 to the main distance indicating device 27 as will appear hereinafter.

The main distance indicating device or indicator 27 comprises (see Figs. 1, 7 and 8) a hollow stationary casing 200, which is provided with a vertical shaft 201 extending through the upper wall thereof, and arranged to oscillate about a fixed vertical axis. Rigidly secured to the upper end of this shaft 201 is one end of a swinging arm or pointer 205, which carries, arranged longitudinally and substantially centrally thereof, a tight wire 206 which is parallel to and spaced above the arm 205 and in a line intersecting and perpendicular to the longitudinal axis of the shaft 201. This wire 206 is terminally secured to binding posts 207 and 208 fixed upon the arm 205. Arranged beneath the arm 205 and coaxial with and loosely surrounding the vertical shaft 201 is a graduated circular dial 210 which is fixedly secured upon the upper surface of the casing 200, and rigidly secured to the arm 205 is a pointer 211 arranged to cooperate with the dial 210. For rotating the shaft 201, there is arranged within a suitable inner casing 215 enclosed within and fixedly secured to the outer casing 200 any usual or suitable electric repeating means (not shown) which is operatively connected to the lower end of the shaft 201, and connected by the cable 175 with the electric transmission means in the casing 158 of the secondary sighting unit 26.

For repeating the rotary movement of the main telescope 65 about an axis coincident with the upwardly extending spindle 70, there is an inner casing 220 arranged within the outer casing 200 and containing any well known or suitable electric repeating means (not shown) which is connected by the cable 75 to the electric transmission means in the casing 158 of the main sighting unit 25 and is arranged to rotate a vertical shaft 221 which is carried by the inner casing 220, and which is arranged to rotate about a vertical axis fixed with respect to the inner casing 220 and coincident with the longitudinal axis of the shaft 221. This shaft 221 projects upwardly through a slot 222 extending longitudinally of the outer casing 200, and rigidly secured to the outer end of this shaft 221 is a horizontal arm 225 which is arranged to pass slidably over the upper surface of the arm 205 and between the latter arm and the wire 206 carried thereby. The upper surface of this arm 225 is in a plane perpendicular to the axis of rotation of the shaft 221 and is provided with a line 226 extending longitudinally thereof and which coincides with an imaginary line which intersects and is perpendicular to the axis of rotation of the shaft 221. The upper surface of the arm 225 is also provided with transverse graduations 227 reading from a zero point coincident with the axis of oscillation of the arm 225 and which are arranged to indicate in any convenient units of length the distance of the target from the point of intersection of the axes of rotation of the main telescope 65 as will appear hereinafter. Between the arm 205 and the casing 200, and loosely surrounding and coaxial with the shaft 221 and rigidly secured to and carried by the inner casing 220 is a graduated circular dial 228, and rigidly secured to the arm 205 is a pointer 229 arranged to cooperate with the dial 228.

The inner casing 220 is adjustable longitudinally of the outer casing 200 upon guides 230 parallel to the longitudinal axes of and rigid with the casing 220, so that the distance between the axes of the shaft 201 and the shaft 221 may be adjusted to correspond to the distance between the point of intersection of the axes of rotation of the main telescope 65 and the point of intersection of the axes of rotation of the secondary telescope 170, so that when the system is in operation the point upon the scale 226 where the wire 206 crosses the central line 226 of the arm 225 will indicate numerically the true distance between the point of intersection of the axes of rotation of the main telescope 65 and the target.

The secondary distance indicator 28 comprises (see Figs. 9 and 10) any suitable flat rigid rectangular base 250, which for convenience of illustration is shown in the drawing as arranged vertically. Mounted upon this base 250 and rigid therewith is a casing 251 containing any well known or suitable electric repeating means (not shown) which is connected by the cable 100 with the transmission means in the casing 90 of the main sighting unit 25. This repeating means in the casing 251 is operatively connected to a spindle 252 which is arranged to be rotated by the repeating means about an axis coincident with its longitudinal axis, and which is perpendicular to and fixed with respect to the base 250. Rigidly secured to the outer end of the spindle 252 is one end of a straight flat arm 255 which is arranged to swing in a plane parallel with the base 250 and perpendicular to the axis of rotation of the spindle 252. The upper surface of the arm 255 is provided with a line 256 extending longitudinally and centrally thereof and which is coincident with an imaginary line intersecting and perpendicular to the axis of rotation of the spindle 252, and the upper surface of the arm 255 is also provided with transverse graduations 257 in any convenient units of length reading from zero point coincident with the axis of oscillation of the arm 255 corresponding to the hereinbefore described graduations 227 on the arm 225 of the main indicator 27. Mounted upon and slidable longitudinally of the arm 255 is a slider 258 which carries a pointer 259 arranged to cooperate with the longitudinal line 256 and graduations 257, and also with other graduations as will appear hereinafter. The slider 258 is yieldingly held in any desired position upon the arm 255 by means of a spring 260 carried by the slider and engaging against the arm, and the slider may be fixedly secured in any desired position upon the arm by means of a set screw 261 which is threaded through the slider and arranged to engage against the spring 260. Projecting perpendicularly from the base 250 and rigid therewith are four posts 263. These posts are braced transversely of the base 250 by rods 264 and 265 and rigidly support two stationary parallel bars or tracks 266 and 267 which extend longitudinally of and parallel to the base 250. Movable longitudinally of and carried by the two bars 266 and 267 respectively are two carriers 268 and 269 preferably provided with rollers 270 and 271 carried thereby and having concave faces engaging the opposite sides of the bars 266 and 267 respectively. These carriers 268 and 269 are connected by a rigid transverse bar 275 the ends of which rest upon and are rigidly secured to the carriers 268 and 269 respectively, the cross bar 275 being arranged in a plane parallel to the base 250 so that the under surface of the bar 275 is spaced very slightly above the upper surface of the swinging arm 255. Slidably secured to the upper surface of the cross bar 275 is a flat scale 276 provided along one edge with suitable transverse graduations 278 in any suitable units of length corresponding to the transverse graduations 257 of the arm 255, and arranged to permit the pointer 259 to cooperate therewith to indicate the altitude of the target, as will appear hereinafter. The scale 276 is secured to the cross bar 275 by means of two screws 280 and 281 which extend loosely through elongated slots 282 and 283 provided therefor in the scale 276, and the screws are threaded into the cross bar 275 and clamp the scale in any desired position of adjustment, the slots 282 and 283 extending longitudinally of the scale to permit of the longitudinal adjustment of the scale with respect to the cross bar 275, so that the zero point 285 of the scale may be set either opposite to, or above or below a point 286 marked therefor upon the cross bar 275 and in an imaginary line 287 drawn through the axis of oscillation of the arm 255 and parallel to the longitudinal axis of the base 250, for a purpose which will appear hereinafter.

The secondary indicator may also be provided with a fixed flat straight scale 288 which is rigidly secured to the outer surface of the casing 251 and which extends in a direction parallel to the longitudinal axis of the base plate 250. The outer surface of this fixed scale is in a plane parallel to the base plate 250 and is arranged to engage against the inner or under surface of the cross bar 275, and is provided with transverse graduations 289 in any suitable units of length reading from a zero point directly opposite the axis of oscillation of the arm 255, and arranged to indicate the horizontal distance between the target and the main telescope, as will appear hereinafter.

In the operation of the hereinbefore described embodiment of this invention the main sighting or aiming unit 25 and the secondary sighting unit 26 are spaced apart at any convenient distance and adjusted so that their respective base plates 50 and 150 will rest substantially in the same horizontal plane, and so that the axis of oscillation of the yoke 61 carrying the main telescope 65 will be positioned in a substantially horizontal plane and substantially coincide with the axis of oscillation of the yoke 156 which carries the secondary telescope 170. The base plates 50 and 150 are then rigidly clamped by the bolts 36 to their respective fixed sub-bases 30.

The main distance indicating device 27 and the secondary distance indicating device 28 are arranged in any convenient locations, and the main indicator 27 is adjusted, if necessary, by sliding the case 220 containing the repeating mechanism longitudinally of the outer case 200 until the distance between the axes of the shafts 201 and 221 is suitably proportioned to the distance between the point of intersection of the two axes of oscillation of the main telescope 65 and the point of intersection of the two axes of oscillation of the secondary telescope 170. The main indicator 27 is also so adjusted that when the telescopes 65 and 170 are aimed perpendicularly to the line joining the above mentioned points of intersection of the two telescopes, the two arms 205 and 255 will be perpendicular to a plane which includes the longitudinal axes of the two shafts 201 and 221.

The secondary indicator is adjusted so that when the main telescope 65 is aimed in a horizontal direction the longitudinal central line 256 of the arm 255 will be parallel to the longitudinal axis of the base 250 and will cross the corresponding graduation 286 of the fixed cross bar 275. The scale 276 of the secondary indicator 28 may also be adjusted longitudinally of the cross bar 275 as hereinbefore described. This adjustment of the scale 276 might be found convenient, for instance, in determining the elevation of a target such as an air craft above the sea level, when the telescopes of the range finder are located any appreciable distance above the sea level, and when the vertical distance between the telescopes and the sea level is known. In such a case the zero point 285 of the scale 276 would be set at such a distance below the fixed point 286 of the cross bar 275 that the graduation on the scale 276 opposite the fixed point 286 would indicate the known elevation of the telescopes above the sea level.

When the various elements of this improved range finder have been thus adjusted, and it is desired to determine the range of the target 290, the two telescopes 65 and 170 are simultaneously aimed at the target 390, as shown in Fig. 1. In effecting the aiming of the main telescope 65, the rotation of the main telescope 65 about the longitudinal axis of its spindle 70, or in other words about the axis perpendicular to the horizontal axis of oscillation, is effective to rotate the spindle 70 and to actuate the transmission mechanism contained in the casing 63, and the rotation of this transmission mechanism is transmitted through the cable 75 to the repeating mechanism contained in the case 220 and which causes the rotation of the shaft 221 and the arm 225 carried thereby through an angle equal to the angle through which the main telescope 65 has been rotated about the spindle 70 by the aiming of the telescope. In aiming the secondary telescope 170, the rotation of this telescope about the longitudinal axis of its supporting shaft 172 acts to rotate the shaft 172 which actuates the transmission mechanism in the case 158, the motion of which is transmitted through the cable 175 to the repeating mechanism in the inner casing 215, thus rotating the shaft 201 carrying the arm 205 and the wire 206, which indicates at the point where the wire 206 crosses the central longitudinal line of the scale 226 the distance between the target 290 and the point of intersection of the axes of oscillation of the main telescope 65.

The rotation of the main telescope about its horizontal axis causes a corresponding rotation of the segmental gear 85 which acts through the pinion 98 to rotate the bevel pinion 93 which actuates the bevel pinion 92 to actuate the transmission mechanism in the case 90, the motion of which is transmitted through the cable 100 to the repeating mechanism contained in the case 251 of the secondary distance indicator 28, and this repeating mechanism is so constructed and adjusted that it rotates the spindle 252 and the arm 255 carried thereby through an arc equal to the arc of rotation of the longitudinal axis or line of sight of the main telescope 65 with respect to the projection of that line on a horizontal plane. The slider 258 is now adjusted manually to cause the pointer 259 to be set upon the graduations 257 at such a point as to indicate upon the graduations 257 a distance equal to the distance from the target to the main telescope as indicated by the crossing of the wire 206 upon the graduations 227 of the arm 225. The transverse bar 275 is then moved longitudinally of the base plate 250 to bring the scale 276 into engagement with the pointer 259, thus indicating upon the scale 276 the altitude of the target and upon the fixed scale 288 the horizontal distance from the main telescope to the vertical line drawn through the target as hereinbefore described.

In the modified form of this invention shown in Figs. 11, 12, 13 and 14, the construction and arrangement of the sighting units 25 and 26 are the same as hereinbefore described, but instead of the main distance indicator 27 and the secondary distance indicator 28 there is substituted in this modified form of the invention a duplex indicator 300 comprising a rigid horizontal stationary flat base 301 spaced above and parallel to which is a flat rigid plate 302 which has mounted thereon and rigidly secured thereto a casing 303 containing any well known or suitable electric repeating mechanism (not shown) which is arranged to cooperate with a cylindrical shaft 304 projecting through the upper side of the case 303 and perpendicular to the base 301. The upper end of this shaft is rigidly secured in the upper end of a rigid bracket 305 which is rigidly secured to and projects upwardly from the base 301. Projecting downwardly from the plate 302, and rigid therewith and in alinement with the shaft 304, is a lug 306 which is provided with a reduced cylindrical lower end 307 coaxial with the shaft 304, and which engages snugly but rotatably in a suitable recess or bearing provided therefor in the base 301 to permit of the rotation of the plate 302 about a fixed axis coincident with the axis of the shaft 304. The repeating mechanism in the case 303 is connected to the cable 75 leading to the main sighting device 25 and corresponds with the hereinbefore described repeating mechanism in the inner casing 220 of the main distance indicator 27, and the shaft 304 corresponds to the hereinbefore described shaft 221 which carries the arm 226. Also fixedly mounted upon and secured to the plate 302 is a casing 310 containing electric repeating mechanism (not shown) of any well known or suitable construction, which is arranged to rotate with respect to the casing 310 a vertical spindle 311 which carries rigidly connected to its upper end a horizontal arm 312 corresponding to the hereinbefore described arm 205, and one horizontal edge 313 of which is straight and in a line intersecting and perpendicular to the axis of rotation of the spindle 311. The repeating mechanism contained in casing 310 corresponds to the electric repeating mechanism in the casing 215 and is connected to the secondary sighting device 26 by the cable 175, as hereinbefore described. The casing 310 rests in a shallow recess 314 provided therefor in the upper surface of the plate 302 and extending longitudinally thereof, and the casing 310 is slidably adjustable longitudinally of the plate 302 in the recess 314 and is clamped securely to the plate 302 in any desired position of adjustment by means of a set screw 315 which extends loosely through a slot 316 provided in an extension 317 rigid with the casing 310 and is threaded into the plate 302.

Depending beneath and carried by the free end of the plate 302, are any suitable rollers 318 or other antifriction means which rests upon a flat segmental track 319 fixed upon the upper surface of the base 301 and coaxial with the shaft 304 to permit of a free rotary movement of the plate 302. Secured to and projecting rigidly upwardly from the base 301 are two standards 320 and 321, which are connected at their upper ends by a rigid stationary straight flat horizontal bar 322, one longitudinal edge 323 of which is in a vertical plane which includes the longitudinal axis of the shaft 304, the upper surface of which is provided with transverse graduations 324 in any suitable units of length measured from the longitudinal axis of the shaft 304, and which correspond to the hereinbefore described scale on the arm 225. Arranged between the standards 320 and 321 and beneath the connecting bar 322 is a truncated cone 325 which is rigidly secured to a spindle 326 extending longitudinally and centrally therethrough and which is terminally mounted for rotation in suitable bearings 327 and 328 provided therefor in the standards 320 and 321, the axis of rotation of the cone 325 being arranged in the vertical plane which includes the longitudinal straight edge 323 of the horizontal bar 322, and the longitudinal axis of the shaft 304 which is the axis of oscillation of the plate 302, and the arrangement of the cone 325 is such that as the cone revolves the elements of the surface of the cone will pass in succession closely under and will be successively parallel to the under surface of the connecting bar 322.

For rotating the cone 325, one end of the shaft 326 has rigidly secured thereto a gear 330 which is engaged by a gear 331 which is fixed upon one end of a shaft 332 which is arranged to rotate about a fixed axis in a bearing provided therefor in a standard 333 rigid with and projecting upwardly from the base 301. The other end of the shaft 332 projects into a casing 335 which is fixed upon the standard 333 and which contains any well known or suitable electrical repeating mechanism (not shown) which is connected by the cable 100 to the repeating mechanism in the case 251 of the secondary indicator 28 as hereinbefore described, and which is arranged to rotate the cone in synchronism with and to a degree corresponding to the degree of rotation of the main telescope 65 in a vertical plane. In this modified construction this rotary shaft 332 corresponds to the hereinbefore described rotary shaft 252 carrying the swinging arm 255 of the secondary indicator 28.

For the convenient determination of any data obtainable in cooperation with the arm 312 and the scale 324, the conical surface of the cone 325 may be provided with one or more sets of lines. For instance, the surface of the cone, shown developed in Figs. 13 and 14, may be provided as shown in Fig. 13, with one set of parallel lines 350, 351, 352, 353, 354, 355 and 356 indicating in any convenient units of length the altitude of the target above the horizontal plane of the horizontal axis of oscillation of the telescopes, and with another set of parallel lines 360 to 366 arranged perpendicularly to the first set to indicate the horizontal or perpendicular distance from the point of intersection of the axis of oscillation of the main telescope 65, to an imaginary vertical line drawn through the target, the altitude and horizontal distance in any particular case being indicated numerically by the projection upon the cone 325 of the point of crossing of the two straight edges 313 and 323.

Or the surface of the cone might be provided, as shown in Fig. 14, with one set of curves 370 to 373 (shown in full lines) to indicate the "angle of elevation" (measured above a line connecting the gun and the target) which it would be necessary to give a gun in order to hit a target located at any distance and elevation from the main telescope, the angle of elevation being indicated numerically in any given case by the projection upon the cone 325 of the point of crossing of the two straight edges 313 and 323.

In combination with the curves indicating the angle of elevation for the gun, the cone 325 might also be provided with another set of curves 380 to 388 (shown in dotted lines) to indicate in seconds or other suitable units the "time of flight" or the time that it would take a projectile issuing from a gun at a predetermined and fixed initial velocity to reach the target when the target is located at a given distance, the "time of flight" in any particular case being indicated numerically by the projection upon the cone 325 of the point of crossing of the two straight edges 313 and 323. Any one or more or all of the four sets of lines just described, or any other lines to give other obtainable data, might be arranged upon the conical surface of the truncated cone 325, but for most purposes it is thought that it would be sufficient to mark upon the cone either the two sets of straight lines shown in Fig. 13 or the two sets of curves shown in Fig. 14.

The segmental cone 325 shown in the drawings is proportioned to cooperate with the main telescope only while the main telescope 65 is positioned or swinging within the vertical limits determined by the rotation of the segmental gear 85 through ninety degrees about its horizontal axis, and as thus proportioned the development of the surface of the cone 325 is in the form of a plane surface included between two radii which form a right angle, but it is to be understood that the truncated cone 325 might be varied in form so as to cooperate with the main telescope 65 during its entire movement about a horizontal axis through an angle either greater or less than a right angle as may be desired.

In the operation of this modified form of this invention shown in Figs. 11 to 14, when the main telescope 65 is sighted upon a target, the rotary movement of the telescope about the longitudinal axis of its upwardly extending spindle 70 will actuate through the transmission means in the case 63, and through the cable 75 the repeating means in the casing 303 which will cause a corresponding rotation of the casing 303 and the plate 302 rigid therewith about the longitudinal axis of the shaft 304. The rotation of the main telescope 65, as measured by the rotation of the longitudinal axis or line of sight of the main telescope with respect to the projection of that line on a horizontal plane, will be transmitted through the cable 100 to the repeating mechanism in the case 335 which will rotate the truncated cone 325 through a corresponding angle. The rotary motion of the secondary telescope 170 about the axis of its upwardly extending spindle 172 will be transmitted through the cable 175 to the repeating mechanism in the case 310, and will cause a corresponding rotation of the shaft 311 and the arm 312 carried thereby.

It is therefore evident that in this modified form of this invention shown in Figs. 11 to 14, when both telescopes are aimed simultaneously at the target, the distance of the target from the intersection of the axes of oscillation of the main telescope, will be automatically indicated numerically upon the graduations of the horizontal bar 322 at the point of crossing of the two straight edges 313 and 323 and the "elevation" of the target, the horizontal distance from the main telescope to an imaginary vertical line drawn through the target, the angle of elevation necessary for the gun, and the time of flight with or without other data will also be automatically indicated numerically by the various lines upon the cone 325 at the projection of the point of crossing of the straight edges 313 and 323 upon the cone 325, as hereinbefore described.

In the modified form of this invention shown in Figs. 15 and 16, a main sighting unit 400 and a second sighting unit 401 somewhat different in construction from the main sighting unit 25 and secondary sighting unit 26 hereinbefore described, are utilized in connection with the hereinbefore described main indicator 27 and secondary indicator 28. The ultimate results obtained by means of this modified form of the invention are the same as the ultimate results obtained in the hereinbefore described system shown in Fig. 1, but are obtained by a somewhat different method.

In this modified form of the invention, the main sighting unit 400 comprises a substantially flat base plate 405 which is arranged when in operation in a substantially horizontal plane and is adjustably and rigidly supported upon any suitable mounting, for instance, upon the upper ends of four vertical adjusting screws 406, the lower ends of which are threaded into any suitable fixed, rigid, sub-base 407, the base plate 405, after having been adjusted, being clamped fixedly in position by any suitable means, for instance, by a bolt 408 extending through the base plate 405 and threaded into the sub-base 407. Extending upwardly from the base plate 405 and rigid therewith is a circular boss 410, rotatably resting upon the upper end of which is a gear 411 provided with a cylindrical spindle 412 projecting downwardly therefrom and coaxial and rigid therewith, which engages snugly but rotatively in a cylindrical aperture or bearing 413 provided therefor through the boss 410 and base plate 405. Rigidly secured to and projecting upwardly from the gear 411 are two spaced standards 415 and 416, spaced between the upper ends of which is a main telescope or other sighting element 420 which is provided with trunnions 421 and 422 rigid therewith and which are provided with reduced cylindrical coaxial outer ends 423 and 424 which engage snugly but rotatably in cylindrical apertures provided therefor in the upper ends of the standards 415 and 416, the main telescope 420 being thus arranged to oscillate with respect to the standards 415 and 416 about a normally substantially horizontal axis which intersects and is always perpendicular to the longitudinal axis of the vertical spindle 412.

For transmitting the rotary movement of the gear 411 a casing 430 is mounted upon and rigidly secured to the base plate 405, and contains any well known or suitable electrical transmission mechanism which is arranged to be actuated by a spindle 431 which projects upwardly through the upper side of the casing 430, and which is arranged to rotate about an axis fixed with respect to the casing 430 and parallel to the longitudinal axis of the spindle 431. Rigidly secured to the upper end of the spindle 431 is a pinion 432 which engages the gear 411 and is rotated thereby. The transmission mechanism in the casing 430 is operatively connected by the cable 75 to the main indicator 27, as hereinbefore described.

For transmitting the rotary motion of the longitudinal axis or line of sight of the main telescope 420 with respect to the projection of that line on a horizontal plane, a casing 435 is rigidly secured to one of the standards 415 and contains electrical transmission mechanism of any well known or suitable construction, which is operatively connected to and arranged to be actuated by the reduced cylindrical end 423 of the corresponding trunnion and which is operatively connected by the cable 100 to the secondary indicator 28, as hereinbefore described.

The secondary sighting unit 401 includes a secondary telescope 440 or other sighting or aiming element, and is of the same construction as that just described for the main sighting unit 400, except that in the secondary sighting unit 401 the hereinbefore described casing 435 and the mechanism contained therein for transmitting the rotary motion of the main telescope about its movable horizontal axis is omitted. In the secondary sighting unit 401, the transmission mechanism in the case 430 for transmitting the rotary motion of the secondary telescope 440 about its vertical axis is operatively connected by the cable 175 to the main indicator 27, as hereinbefore described.

In the modified system shown in Figs. 15 and 16, the sighting units 400 and 401 and the indicators 27 and 28 are adjusted substantially as hereinbefore described in connection with the system shown in Fig. 1, so that the main telescope 420 and the secondary telescope 440 will be arranged to rotate about two parallel fixed vertical axes respectively and also so that each of these telescopes may oscillate about a variable horizontal axis intersecting its vertical axis of oscillation. The main indicator 27 is also adjusted, as hereinbefore described, so that the perpendicular distance between the two axes of oscillation of the two arms 205 and 225 will be suitably proportioned to the horizontal distance between a vertical line containing the point of intersection of the two axes of oscillation of the main telescope 420 and a vertical line containing the point of intersection of the two axes of oscillation of the secondary telescope 440.

In the operation of the modified system shown in Figs. 15 and 16, the aiming of the two telescopes 420 and 440 upon a target 445 causes the arms 205 and 225 of the main indicator 27 to be rotated accordingly, as hereinbefore described, but the point of crossing of the wire 206 upon the central line 226 of the scale 227 will indicate numerically the horizontal distance from the point of intersection of the axes of oscillation of the main telescope 420 to an imaginary vertical line extending through the target 445, instead of the actual distance between that point and the target as in the system shown in Fig. 1. Having thus obtained the horizontal distance from the main telescope to the vertical projection of the target, the cross bar 275 of the secondary indicator 28 is moved along the fixed scale 288 until the distance upon the scale indicated by the position of the cross bar 275 is equal to the horizontal distance from the main telescope to the vertical projection of the target as just obtained, whereupon the slide 258 is moved to bring the pointer 259 into engagement with the scale 276, and the position of the pointer 259 thus determined will indicate upon the central line 256 of the arm 255 the actual distance from the point of intersection of the axes of oscillation of the main telescope 420 to the target 425, and the position of the pointer 259 upon the transverse scale 276 will indicate the elevation of the target.

In the modified form of this invention shown in Figs. 17, 18, 19 and 20, the system is the same as that shown in Figs. 15 and 16, except that instead of having a main indicator 27 and a secondary indicator 28, both indicators are combined in a duplex indicator 450, which is the same in construction and arrangement as the duplex indicator shown in Figs. 11 and 12, except that instead of the cone 325 and its supporting standards 320 and 321 and its actuating mechanism comprising the parts 326 and 335 shown in Figs. 11 and 12, the modified form shown in Figs. 17 and 18 includes two vertical standards 451 and 452 projecting upwardly from and rigid with the base 301 and rigidly connected at their upper ends by a bar 453 which is parallel to the base 301 and which has one straight longitudinal edge 454 which is arranged in a plane which includes the longitudinal axis of the spindle 304. Arranged beneath the bar 453 and between the standards 451 and 452 is a cylinder 455 which is rigidly secured to a spindle 456 extending longitudinally and axially therethrough, the opposite ends of which engage snugly but rotatably in bearings 457 and 458 provided therefor in the standards 451 and 452, the longitudinal axis of the spindle 456 being arranged in a plane containing the straight edge 454 and the longitudinal axis of the shaft 304. For rotating the cylinder 455 there is rigidly secured to one end of the spindle 456 a gear 460 which is engaged by a pinion 461 which is rigidly mounted upon one end of a shaft 462 which is parallel to the spindle 456 and extends snugly but rotatably through a bearing provided therefor in the upper end of a standard 463 which projects upwardly from and is rigid with the base 301. The spindle 462 is arranged to be actuated by any well known or suitable electrical repeating mechanism contained in a casing 465 which is rigidly secured to the standard 463, and which is operatively connected by the cable 100 to the transmission mechanism contained in the casing 435 of the main sighting unit 400 (see Figs. 15 and 16). The repeating mechanisms contained in the casings 303 and 310 are operatively connected by the cables 75 and 175 to the transmission mechanisms contained in the casings 430 of the main and secondary sighting units 400 and 401 respectively, as hereinbefore described. (See Figs. 15 and 16).

The cylindrical surface of the cylinder 455 may be provided with any suitable lines or curves to indicate numerically any desired obtainable data in cooperation with the straight edges 313 and 454. For instance, the cylindrical surface of the cylinder 455 might be provided, as indicated in the development of the cylindrical surface of the cylinder 455 shown in Fig. 19, with one set of curves 466 numbered in any suitable units of length and arranged to indicate the "range" or actual distance of the target from the point of intersection of the axes of oscillation of the main telescope 420. The cylindrical surface of the cylinder 455 might also be provided with another set of curves 467 suitably numbered in any units of length and arranged to indicate the altitude of the target above the horizontal plane containing the point of intersection of the axes of oscillation of the main telescope 420. The cylindrical surface of the cylinder 455 might also be provided as shown in the development of the cylindrical surface in Fig. 20 with one set of curves 468 suitably numbered in any convenient units of time and arranged to indicate the "time of flight", or the time that it would take a projectile issuing from a gun at a predetermined and fixed initial velocity to reach the target when the target is located at a given distance and elevation from the main telescope. The cylindrical surface of the cylinder 455 may also be provided, as shown in Fig. 20, with another set of curves 469 numbered in any suitable units of angular measurement, as for instance, in degrees and fractions of a degree, and arranged to indicate the angle of elevation (measured from the line of sight) which it would be necessary to give a gun located at the main telescope 420 to hit a target located at any distance and elevation from the main telescope.

Any one or more, or all of the four sets of lines shown in Figs. 19 and 20, and just described, or any other lines to give other obtainable data might be arranged upon the cylindrical surface of the cylinder 455, and in any case, the projection of the point of crossing of the two straight edges 313 and 454 upon the cylindrical surface of the cylinder 455 would indicate numerically upon the lines or curves upon the cylinder the correct reading of such lines or curves for the range and elevation of the target with respect to the main telescope 420 indicated by the position of the movable arm 312, and the position of the cylinder 455 as determined by the aiming of the telescopes 420 and 440 as hereinbefore described.

It is thought that the operation of the modified form of this invention shown in Figs. 17 to 20 will be clearly understood from the foregoing description.

The lines or curves shown in Figs. 13, 14, 19 and 20 may not be even approximately correct in form for any particular set of conditions, but are thought to be sufficiently accurate for the purposes of this application, as approximately correct lines or curves giving the "altitude," horizontal distance, "angle of elevation," "time of flight" etc. for any given set of conditions may be plotted by well known methods by those familiar with the art.

Instead of having a main aiming element connected to operate two separately operative transmission devices, as hereinbefore decided, two separately operative aiming elements may be substituted for the main aiming element and arranged to actuate the two transmission devices. For instance, in the system shown in Fig. 1 instead of the main aiming unit 25, an aiming unit which is a duplicate of the secondary aiming unit 26, shown in Fig. 1, and an aiming unit which is the duplicate of the main aiming unit 400, shown in Fig. 15, except that the transmission device in the casing 430 is omitted, may be substituted, the transmission device in the casing 158 of the former of these substituted aiming units being connected by the conductor 75 to operate the corresponding repeating device in the casing 220, and the transmission device in the casing 435 of the latter substituted aiming unit being connected by the conductor 100 to operate the corresponding repeating device in the casing 251, as hereinbefore described, the system shown in Fig. 1 being otherwise as hereinbefore described in construction and operation.

In Fig. 21 is shown a modified form of this invention in which the system is arranged to indicate automatically upon a chart the exact position of a marine vessel, and by the aid of which the course of the vessel may be plotted and the rate of movement of the vessel and the approximate position the vessel will occupy at any future moment within a reasonable limit of time may be determined. In this modified form the system comprises two aiming devices or units 475 and 476, and a modified indicating device 480. Each of the aiming devices 475 and 476 is identical in construction and arrangement with the secondary aiming device 401 shown in Fig. 15 and hereinbefore described, and the modified indicating device 480 is substantially identical in construction with the main indicating device shown in Figs. 1, 7 and 8 and hereinbefore described, except that instead of the hereinbefore described arms 205 and 225, two modified arms 481 and 482 are substituted and are rigidly secured to the hereinbefore described shafts 201 and 221 respectively. These modified arms are provided respectively with two straight edges 483 and 484 which lie respectively in two planes which include respectively the longitudinal axes of the two shafts 201 and 221. The electrical transmission mechanism 430 of the telescope or aiming element 440 of one aiming device 475 is connected by a conductor 485 with the repeating mechanism contained in the casing 220 and which actuates the shaft 221 while the electrical transmission mechanism 430 of the telescope or aiming element 440 of the other aiming device 476 is connected by a conductor 486 with the electrical repeating mechanism contained in the casing 215 and which actuates the shaft 201. As hereinbefore described and for the purpose hereinbefore set forth, the casing 220 carrying the shaft 221 is adjustable towards and away from the casing 215 carrying the shaft 201. Arranged in a plane parallel to and spaced slightly away from the paths of movement of the modified arms 481 and 482 is a stationary chart 490 upon which the shore or coast lines 491, 492 and 493 of the harbor or portion of a coast which it is desired to control, may be marked in a greatly reduced scale as at 491', 492' and 493'. For convenience in reading, the chart may be provided with a set of equispaced parallel lines 494 extending longitudinally of the chart and with a similar set of equispaced parallel lines 495 perpendicular to the former set and extending transversely of the chart, both sets of lines being spaced apart in accordance with the scale of the chart to indicate any convenient units of length. The location of submarine mines 496 in the harbor may also be indicated upon the chart by marks 496', and the chart may also be provided with any other desired marks.

In the operation of the modified form of this invention shown in Fig. 21, the two aiming devices 475 and 476 are spaced apart at a suitable distance, and the shaft 221 of the indicating device 480 is correspondingly adjusted towards or away from the shaft 201 to make the ratio between the distance between the parallel axes of rotation of the two modified arms 481 and 482 and the distance between the vertical axes of rotation of the two telescopes 440 equal to the scale of the chart 490, for instance, if the chart 490 is drawn on a scale of one to one thousand, then the distance between the shafts 201 and 221 should be one-thousandth of the distance between the vertical axes of rotation of the telescopes 440. The indicator 480 is also adjusted as a whole with respect to the chart 490 so that the axes of rotation of the modified arms 481 and 482 will be perpendicular to the plane of the chart and located in the same relative positions with respect to the coast line 491' of the chart as the vertical axes of rotation of the two telescopes or aiming elements 440 are located with respect to the corresponding actual coast line 491. After the parts have been thus adjusted, when it is desired to locate a vessel 497 upon the chart 490, the two telescopes 440 are aimed upon the vessel 497 and the modified arms 481 and 482 are thereby correspondingly rotated, as hereinbefore described, and the point 497' upon the chart where the straight edges 483 and 484 cross will represent upon the chart 490 the location of the vessel 497 in the harbor. As the vessel 497 travels across the harbor its successive positions 498, 499, 500 and 497 at the ends of equal successive intervals of time may be plotted upon the chart 490 at corresponding points 498', 499', 500' and 497', thus showing the direction of the movement of the vessel and enabling the rate of movement of the vessel and its approximate position at any future moment within a reasonable limit of time to be readily determined. The data thus determined as to the position of the vessel and as to the rate of its movement, makes it possible to aim a gun from shore upon the vessel with great accuracy, and it also enables an operator upon the shore to determine the proper moment for exploding any submarine mine in order to cause the mine to act with the greatest effectiveness upon the vessel.

In Figs. 22 to 25 is shown a modified form of indicating device 524, in which the construction and operation are identical with the construction and operation of the main indicating device 27 hereinbefore described and shown in Figs. 1, 7 and 8, except that this modified form includes additional parts for finding the distance between the target and the gun and the position into which the gun should be rotated about its vertical axis in order to be trained upon the target when the gun is located at a known point between the aiming elements. These additional parts include a flat rigid adjustable base 525, which rests upon the flat upper outer surface of the casing 200 and is provided upon its under side with an oblong rectangular rib 526 integral therewith and which fits snugly but slidably in an elongated slot 527 provided therefor in the upper wall of the casing 200 and extending longitudinally thereof in a direction parallel to the plane containing the longitudinal axes of the hereinbefore described two shafts 201 and 221. The base 525 is slidably adjustable longitudinally of the slot 527 and is clamped fixedly in any desired position of adjustment by means of a bolt extending loosely through the base and having its inner end threaded into a clamping plate 528 (see Fig. 25) which is arranged to engage against the under surface of the upper wall of the casing 200. The base 525 is provided upon its upper surface with a transversely extending rectangular recess 529 in which snugly but adjustably fits a rigid rectangular slider 530, which is held fixedly in any desired position of adjustment with respect to the base 525 by means of a bolt extending loosely through an elongated slot 531 provided therefor in the slider 530, the lower end of the bolt being threaded into the base 525. Rigid with the slider 530 and projecting upwardly therefrom is a rigid bracket 535, the outer portion of which is enlarged and in the form of a flat circular rigid support 536, and upon and coaxial with this support 536 is a flat rigid plate 537 which is rigid with the upper end of a cylindrical spindle 538 which extends snugly but rotatively through a cylindrical aperture provided therefor centrally through the circular support 536, the longitudinal axis of the spindle being at all times parallel to the longitudinal axis of the hereinbefore described shafts 201 and 221, and the lower end of the spindle being provided with a nut 539 and washer 540 to hold the spindle against longitudinal movement. The upper surface of the circular plate 537 is provided with an undercut diametrical recess 545 in which fits snugly but slidably an elongated rigid auxiliary arm 550, the major portion of which is straight and in a plane spaced above and parallel to the plane of oscillation of the hereinbefore described arm 225, and the outer portion 551 of this elongated arm 550 extends downwardly and terminates in a sharp point 552 which is spaced slightly above the plane of oscillation of the hereinbefore described wire 206 and is arranged to be adjusted to register with the point of crossing between the wire 206 and the central line 226 of the hereinbefore described arm 225. The circular support 536 may be provided with suitable graduations 555 indicating degrees and fractions of a degree, and the circular plate 537 may be provided with a suitable zero graduation 556 so that the amount of rotation of the arm 550 from its zero position may be readily determined and its position at any time conveniently identified. The upper surface of the auxiliary arm 550 is provided with transverse graduations 560 arranged to indicate suitable units of length and to read from the pointer 552. A sliding scale 561 having a zero graduation 562 is slidably mounted in a recess provided therefor in the upper surface of the circular plate 537 and is held in any desired position of longitudinal adjustment by means of a clamping screw 563 which extends loosely through an elongated slot provided therefor in the scale and which is threaded into the plate 537. The plate 537 is provided with a corresponding series of graduations 564 extending along the outer edge of the sliding scale 561 and having a zero graduation 565 which is perpendicular to the arm 550 and in a line intersecting the axis of oscillation of the arm 550.

This modified form of indicator 524 (shown in Figs. 22 to 25) may be substituted for the main indicating device 27 in the system shown in Fig. 1 and hereinbefore described, and its operation when thus substituted is exactly as hereinbefore described with respect to the operation of the arms 205 and 225.

In the operation of this modified indicator 524 the axis of oscillation of the auxiliary arm, which coincides with the longitudinal axis of its spindle 538, is first adjusted, by adjusting the base 525 and the transverse slider 530, until it occupies the same relative position with respect to the axes of oscillation of the other two arms 205 and 225 that the gun does with respect to the main and secondary aiming units 25 and 26, and after this adjustment has been effected and the two arms 205 and 225 have been positioned by the aiming of the two aiming elements upon the target, the actual distance from the gun to the target may be determined by rotating and sliding the auxiliary arm 550 until its pointer 552 registers with the point of crossing of the wire 206 and the central line 226, whereupon, assuming that the zero graduation of the scale 561 is set opposite the zero graduation 565 of the plate 537, the actual distance from the gun to the target will be indicated by the reading of the zero point of the scale 561 upon the graduations 560 of the arm 550.

The scale 561 may be adjusted so that its zero graduation 562 is positioned at a suitable distance either in advance of or in the rear of the zero graduation 565 of the plate 537 so as to compensate approximately for wind pressure, differences in elevation between the gun and the target, and other variable factors which enter into consideration in aiming the gun, the proper adjustment of the scale 561 for any particular case having been determined experimentally or in any other suitable manner.

While only a few of the forms have been shown herein in which this invention may be embodied, it is to be understood that the invention is not limited to any specific construction, but might be applied in various forms without departing from the spirit of this invention or the scope of the appended claims.

Having thus fully described this invention, we claim:

1. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and indicating means including two movable indicating elements controlled by said aiming elements respectively in accordance with the movement of said aiming elements about said movable axes respectively.

2. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, indicating means including two movable indicating elements controlled by said aiming elements respectively in accordance with the movement of said aiming elements about said movable axes respectively, and an indicating element arranged to be moved in response to and in accordance with the angular movement of one of said aiming elements as measured by the angular movement of the line of sight of said aiming element with respect to its projection upon a horizontal plane.

3. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and indicating means including two indicating elements arranged to be rotated by said aiming elements respectively in accordance with the rotation of said aiming elements about said movable axes respectively.

4. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, indicating means including two indicating elements arranged to be rotated by said aiming elements respectively in accordance with the rotation of said aiming elements about said movable axes respectively, and an indicating element arranged to be rotated in response to and in accordance with the angular movement of one of said aiming elements as measured by the angular movement of the line of sight of said aiming element with respect to its projection upon a horizontal plane.

5. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and indicating means including two indicating elements arranged to be rotated about parallel axes in response to and in accordance with the movement of said aiming elements about said movable axes respectively.

6. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and indicating means including two indicating elements arranged to be rotated about parallel axes in respect to and in accordance with the movement of said aiming elements about said movable axes respectively, and an indicating element arranged to be rotated in response to and in accordance with the angular movement of one of said aiming elements as measured by the angular movement of the line of sight of said element with respect to its projection upon a horizontal plane.

7. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and distance indicating means including two elements arranged to be rotated about parallel axes by and in accordance with the movement of said aiming elements about said movable axes respectively, one of said indicating elements being carried by and arranged to be moved by the other one of said indicating elements.

8. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and distance indicating means including two elements arranged to be rotated about parallel axes by and in accordance with the movement of said aiming elements about said movable axes respectively, one of said indicating elements being carried by and arranged to be moved by the other one of said indicating elements, and an indicating element arranged to cooperate with said first mentioned indicating elements and to be rotated by and in accordance with the angular movement of one of said aiming elements as measured by the angular movement of the line of sight of said aiming element with respect to its projection upon a horizontal plane.

9. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and distance indicating means including two indicating elements arranged to be moved by and in accordance with the angular movement of said aiming elements about said movable axes respectively, one of said indicating elements being mounted upon and rotated by the other of said indicating elements.

10. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and distance indicating means including two indicating elements arranged to be moved by and in accordance with the angular movement of said aiming elements about said movable axes respectively, one of said indicating elements being mounted upon and rotated by the other of said indicating elements, and a distance indicating element arranged to cooperate with one of said first mentioned distance indicating elements and to be moved in response to and in accordance with the angular movement of one of said aiming elements as measured by the angular movement of the line of sight of said aiming element with respect to its projection upon a horizontal plane.

11. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and indicating means including an indicating element arranged to be rotated about a fixed axis by and in accordance with the angular movement of one of said aiming elements about the corresponding one of said movable axes, and an indicating element carried by said first mentioned indicating element and arranged to be rotated about an axis fixed with respect to said first mentioned indicating element in response to and in accordance with the angular movement of the other one of said aiming elements about the corresponding one of said movable axes.

12. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, indicating means including an indicating element arranged to be rotated about a fixed axis by and in accordance with the angular movement of one of said aiming elements about the corresponding one of said movable axes, and an indicating element carried by said first mentioned indicating element and arranged to be rotated about an axis fixed with respect to said first mentioned indicating element in response to and in accordance with the angular movement of the other one of said aiming elements about the corresponding one of said movable axes, and an indicating element cooperating with said first mentioned indicating elements and arranged to be rotated about a fixed axis in response to and in accordance with the angular movement of one of said aiming elements as measured by the angular movement of the line of sight of said aiming element with respect to its projection upon a horizontal plane.

13. A range finder including two spaced aiming elements rotatable about a fixed axis and also rotatable respectively about two movable axes which always intersect said common axis in fixed points, and which are rotatable with respect to said fixed axis in two planes perpendicular to said fixed axis respectively, and indicating means including an indicating element arranged to be rotated about a fixed axis by and in accordance with the angular movement of one of said aiming elements about the corresponding one of said movable axes, an indicating element carried by said first mentioned indicating element and arranged to be rotated about an axis fixed with respect to said first mentioned indicating element in response to and in accordance with the angular movement of the other one of said aiming elements about the corresponding one of said movable axes, and an indicating element arranged to cooperate with said second mentioned indicating element and to be rotated in response to and in accordance with the angular movement of one of said aiming elements as measured by the angular movement of its line of sight with respect to its projection upon a horizontal plane, said last mentioned axis being arranged in a plane with said fixed axis of said first mentioned indicating element.

14. A range finder including two spaced aiming elements rotatable about a fixed axis and also rotatable respectively about two movable axes which always intersect said fixed axis in fixed points, and which are rotatable with respect to said fixed axis in two planes perpendicular to said fixed axis respectively, and indicating means including an indicating element arranged to be rotated about a fixed axis by and in accordance with the angular movement of one of said aiming elements about the corresponding one of said movable axes, an indicating element carried by said first mentioned indicating element and arranged to be rotated about an axis fixed with respect to said first mentioned indicating element in response to and in accordance with the angular movement of the other one of said aiming elements about the corresponding one of said movable axes, and an indicating element having a surface formed by the rotation of a straight line about a fixed axis, said last mentioned element being arranged to cooperate with said first mentioned indicating element and to be rotated in response to and in accordance with the angular movement of one of said aiming elements as measured by the angular movement of its line of sight with respect to the projection of its line of sight upon a horizontal plane.

15. A range finder comprising two separately movable aiming elements and indicating means controlled thereby and including cooperating elements provided with a plurality of series of graduations arranged to indicate respectively and numerically, when said aiming elements are simultaneously aimed at a target, the distance from one of said elements to said target, the elevation of said target with respect to a given horizontal plane, the angle of elevation necessary in aiming a gun located at said element to cause a projectile discharged from said gun at a given initial velocity to strike said target, and the time of flight of said projectile from said gun to said target.

16. A range finder including two separately movable aiming elements, and indicating means controlled thereby and including cooperating elements provided with a plurality of series of graduations arranged to indicate respectively and numerically, when said aiming elements are simultaneously aimed at a target, the angle of elevation required in a gun located adjacent one of said elements to cause a projectile discharged from said gun at a given initial velocity to strike a target upon which said aiming elements are sighted.

17. A range finder including two separately movable aiming elements, and indicating means controlled thereby and including cooperating elements provided with a plurality of series of graduations arranged to indicate respectively and numerically, when said aiming elements are simultaneously aimed at a target, the angle of elevation required in a gun located adjacent one of said elements to cause a projectile discharged from said gun at a given initial velocity to strike a target upon which said aiming elements are sighted, and to simultaneously indicate numerically the time of flight required by said projectile to travel from said gun to said target.

18. A range finder including two spaced aiming elements rotatable about a fixed axis and also rotatable respectively about two movable axes which are arranged in and which are rotatable in two planes respectively which are perpendicular to said fixed axis, and distance indicating means including two indicating elements arranged to be moved in response to and in accordance with the movements of said aiming elements about said movable axes respectively.

19. A range finder including two spaced aiming elements rotatable about a fixed axis and also rotatable respectively about two movable axes which are arranged in and which are rotatable in two planes respectively which are perpendicular to said fixed axis, and distance indicating means including two indicating elements arranged to be rotated about parallel axes in response to and in accordance with the rotation of said aiming elements about said movable axes respectively.

20. A range finder including a plurality of aiming elements, rotatable about substantially alined axes respectively and also separately rotatable about a plurality of axes perpendicular to and movable in planes perpendicular to said first-mentioned axes respectively and a plurality of cooperating separately movable indicating elements arranged to be actuated in response to and in accordance with certain movements of said aiming elements respectively.

21. A range finder including a plurality of separately movable aiming elements, each of said aiming elements being rotatable about a fixed axis and also about a movable axis arranged in and rotatable in a plane perpendicular to said fixed axis, and indicating means including an indicating element arranged to be actuated by and in accordance with the rotation of one of said aiming elements about its fixed axis, an indicating element arranged to be actuated by and in accordance with the rotation of another of said aiming elements about its fixed axis, and an indicating element arranged to be actuated in response to and in accordance with the rotation of one of said aiming elements as measured by the rotation of its line of sight with respect to the projection of said line of sight upon a horizontal plane.

22. A range finder comprising a plurality of aiming elements rotatable respectively about fixed substantially alined axes and also rotatable about axes which are movable in planes perpendicular to said fixed axes, and a plurality of separately movable indicating elements controlled by said aiming elements respectively.

23. A range finder comprising a plurality of aiming elements rotatable respectively about fixed substantially horizontal axes and also rotatable about axes which are movable in planes perpendicular to said fixed axes, respectively, and a plurality of separately movable indicating elements controlled by said aiming elements respectively.

24. A range finder comprising a plurality of separately movable aiming elements, and indicating means arranged to be actuated thereby and comprising a plurality of movable indicating elements, one of said indicating elements being provided with a plurality of series of graduations, and another of said indicating elements being arranged to indicate upon said graduations simultaneously a plurality of measurements relative to a target upon which said aiming elements are directed.

25. A range finder comprising a plurality of separately movable aiming elements, and indicating means arranged to be actuated thereby and comprising a plurality of separately movable indicating elements, one of said indicating elements being provided with a plurality of series of graduations, and another of said indicating elements being arranged to indicate upon said graduations simultaneously a plurality of measurements relative to a target upon which said aiming elements are directed.

26. A range finder comprising a plurality of separately movable aiming elements, and indicating means actuated thereby and comprising a plurality of separately movable indicating elements, one of said elements being provided with a plurality of series of graduations, each of said series being consecutively numbered, and another of said indicating elements being arranged to cooperate with said graduations for simultaneously indicating a plurality of measurements with respect to a target whenever said aiming elements are directed upon said target.

27. A range finder comprising a plurality of aiming elements, and indicating means actuated thereby and comprising a plurality of indicating elements, said indicating elements being provided with a series of graduations indicating the distance of a target from a given point and also with a series of graduations indicating the distance of said target from a given plane passing through said point, and said indicating elements being arranged to indicate simultaneously upon said two series of graduations respectively the distance of a target from a given plane passing through said point whenever said aiming elements are directed upon said target.

28. A range finder comprising a plurality of aiming elements, and indicating means actuated thereby and comprising a plurality of movable indicating elements, said indicating elements being provided with a series of graduations indicating the distance of a target from a given point and also with a series of graduations indicating the distance of said target from a given plane passing through said point, and said indicating elements being arranged to indicate simultaneously upon said two series of graduations respectively the distance of a target from a given point and the distance of said target from a given plane passing through said point whenever said aiming elements are directed upon said target.

29. A range finder comprising a plurality of separately movable aiming elements, and indicating means actuated thereby and comprising a plurality of separately movable indicating elements, one of said indicating elements being provided with a series of graduations indicating the distance of a target from a given point and also with a series of graduations indicating the distance of said target from a given plane passing through said points, and said indicating elements being so arranged as to indicate simultaneously upon said two series of graduations respectively the distance of a target from a given point and the distance of said target from a given plane passing through said point, whenever said aiming elements are directed upon said target.

30. A range finder comprising a plurality of separately movable aiming elements, and indicating means actuated thereby and comprising a plurality of separately movable indicating elements, one of said indicating elements having a surface formed by the revolution of a straight line about a given axis and having marked upon said surface a series of graduations, and another of said indicating elements being arranged to cooperate with said graduations to indicate a corresponding measurement with respect to a target upon which said aiming elements may be directed.

31. A range finder comprising two separately movable aiming elements, and indicating means actuated thereby, said indicating means comprising a plurality of separately movable indicating elements, one of said indicating elements having a surface formed by the revolution of a straight line about a given axis and having upon said surface a plurality of series of graduations corresponding to a plurality of series of measurements with respect to a target, and another of said indicating elements being arranged to cooperate with said graduations to indicate simultaneously a plurality of measurements with respect to a target whenever said aiming elements are directed upon said target.

32. A range finder comprising a plurality of movable aiming elements, and indicating means actuated thereby and comprising a plurality of indicating elements provided with a series of graduations corresponding to distances of a target in units of lengths from a given point and distances of said target in units of length from a horizontal plane passing through said point respectively, said indicating elements being arranged to indicate upon said graduations the distance of a target from a given point, and the distance of said target from a horizontal plane passing through said point whenever said aiming elements are directed upon said target.

33. A range finder comprising a plurality of movable aiming elements, and indicating means actuated thereby and comprising an element provided with graduations corresponding to distances of a target from a given point measured in units of length, a movable element provided with graduations corresponding to distances of said target measured in units of length from a horizontal plane passing through said target, and a movable element arranged to cooperate with said first-mentioned indicating elements to indicate simultaneously upon said graduations the distance of a target from a given point and also from a horizontal plane passing through said point whenever said aiming elements are directed upon said target.

34. A range finder comprising a plurality of separately movable aiming elements, and indicating means actuated thereby and including three indicating elements movable respectively in fixed paths and arranged to be controlled by said aiming elements, one of said indicating elements to indicate simultaneously a plurality of measurements with respect to a target whenever said aiming elements are directed upon said target.

35. A range finder comprising a plurality of separately movable aiming elements, and indicating means actuated thereby and including three indicating elements arranged to swing respectively in fixed paths and to be swung by the movement of said aiming elements in such a manner as to cooperate to simultaneously indicate a plurality of measurements relative to a target whenever said aiming elements are directed upon said target.

36. A range finder comprising a plurality of separately movable aiming elements, and indicating means actuated thereby and including three indicating elements arranged to move respectively in three different fixed paths, one of said indicating elements being provided with graduations corresponding to measurements relative to a target, and a relatively fixed element provided with a series of graduations corresponding to measurements relative to said target, said movable indicating elements being arranged to be controlled by said aiming elements in such a manner that when said aiming elements are directed upon a target, said indicating elements will cooperate with said relatively fixed element to simultaneously indicate upon said two series of graduations two measurements relating to said target.

37. A range finder comprising a plurality of separately movable aiming elements, and indicating means actuated thereby and including three indicating elements arranged to swing respectively in three different fixed paths, one of said indicating elements being provided with graduations corresponding to measurements relative to a target, and a relatively fixed element provided with a series of graduations corresponding to measurements relative to said target, said movable indicating elements being arranged to be controlled by said aiming elements in such a manner that when said aiming elements are directed upon a target, said indicating elements will cooperate with said relatively fixed element to simultaneously indicate upon said two series of graduations two measurements relating to said target.

38. A range finder comprising a plurality of separately movable aiming elements, and indicating means actuated thereby and including three indicating elements arranged to move respectively in three different fixed paths, one of said indicating elements being provided with graduations corresponding to measurements relative to a target, and a relatively fixed element provided with a series of graduations corresponding to measurements relative to said target, said movable indicating elements being arranged to be controlled by said aiming elements in such a manner that when said aiming elements are directed upon a target, said indicating elements will cooperate with said relatively fixed element to simultaneously indicate upon said two series of graduations two measurements relating to said target, one of said indicating elements being carried by and arranged to move with respect to another of said indicating elements.

39. A range finder comprising a plurality of separately movable aiming elements, and indicating means actuated thereby and including three indicating elements arranged to swing respectively in three different fixed paths, one of said indicating elements being provided with graduations corresponding to measurements relative to a target, and a relatively fixed element provided with a series of graduations corresponding to measurements relative to said target, said movable indicating elements being arranged to be controlled by said aiming elements in such a manner that when said aiming elements are directed upon a target, said indicating elements will cooperate with said relatively fixed element to simultaneously indicate upon said two series of graduations two measurements relating to said target, one of said indicating elements being carried by and arranged to swing with respect to another of said indicating elements.

40. A range finder comprising a plurality of separately movable aiming elements, and indicating means actuated thereby and including three indicating elements arranged to swing in fixed paths respectively about three different predetermined axes respectively, one of said indicating elements having a surface formed by the revolution of a straight line about the said axis of said indicating element and being provided with a series of graduations upon said surface corresponding to measurements with respect to a target, and a fixed element provided with graduations corresponding to measurements relative to said target and arranged parallel to and in close proximity to an element of said surface, said indicating elements being arranged to be swung in said paths as the result of the movement of said aiming elements and in such a manner that when said aiming elements are directed upon a target said indicating elements will cooperate with said fixed elements to simultaneously indicate upon said two series of graduations two measurements relative to said target.

41. A range finder comprising a plurality of separately movable aiming elements, and indicating means actuated thereby and including a fixed element provided with a series of graduations corresponding to linear distances from a given point to a target, and an indicating element arranged to rotate about a fixed axis and having a surface formed by the rotation of a straight line about said axis and provided with a series of graduations corresponding to measurements relative to a target, said surface being arranged in close proximity to said fixed element, a second indicating element arranged to swing in a fixed path about a fixed axis, and a third indicating element carried by said second indicating element and arranged to swing with respect thereto about an axis fixed with respect thereto, said third indicating element being arranged to swing across said first-mentioned indicating element and said fixed element to simultaneously indicate thereon two dimensions corresponding to a target whenever said aiming elements are simultaneously directed upon said target.

42. A range finder comprising a plurality of separately movable aiming elements, and indicating means actuated thereby and including a fixed element provided with a series of graduations corresponding to linear distances from a given point to a target, and an indicating element arranged to rotate about a fixed axis and having a surface formed by the rotation of a straight line about said axis and provided with a plurality of series of graduations corresponding to measurements relative to a target, said surface being arranged in close proximity to said fixed element, a second indicating element arranged to swing in a fixed path about a fixed axis, and a third indicating element carried by said second indicating element and arranged to swing with respect thereto about an axis fixed with respect thereto, said third indicating element being arranged to swing across said first-mentioned indicating element and said fixed element to simultaneously indicate thereon two dimensions corresponding to a target whenever said aiming elements are simultaneously directed upon said target.

43. A range finder comprising a plurality of separately movable aiming elements, and indicating means actuated thereby and including a fixed element provided with a series of graduations corresponding to the distance of a target from a given point, an indicating element arranged to swing about a fixed axis and provided with a series of graduations corresponding to the vertical distance of said target from a given horizontal plane, and a movable indicating element arranged to cooperate with said fixed element and said first-mentioned indicating element to simultaneously indicate upon said two series of graduations the distance of a target from a given point and the vertical distance of said target from a horizontal plane passing through said point whenever said aiming elements are simultaneously directed upon said target.

44. A range finder comprising a plurality of separately movable aiming elements, and indicating means including a plurality of cooperating indicating elements controlled by said aiming elements and arranged to indicate the range and elevation of a target upon which said aiming elements are directed, and to indicate also other data for use in firing a projectile at said target.

45. A range finder comprising a plurality of separately movable aiming elements, and indicating means controlled thereby including a plurality of indicating elements provided with a plurality of series of graduations for indicating the range and elevation of a target and also for indicating other data for use in firing a projectile at a target, said indicating elements being so arranged as to indicate simultaneously at least three different measurements with respect to a target upon which said aiming elements may be directed.

46. A range finder comprising a plurality of separately movable aiming elements, and indicating means controlled thereby including a plurality of indicating elements provided with a plurality of series of graduations for indicating the range and elevation of a target and also for indicating other data for use in firing a projectile at a target, said indicating elements being so arranged as to indicate simultaneously more than three different measurements with respect to a target upon which said aiming elements may be directed.

47. A range finder comprising a plurality of aiming elements arranged to be separately oscillated and indicating means comprising three cooperating indicating elements two of which are arranged to be oscillated by and in accordance with the oscillation of two of said aiming elements respectively and the third of which is arranged to be oscillated by and in accordance with the oscillation in altitude of one of said aiming elements and in such a manner as to cooperate with the other indicating elements to point out a measurement with respect to a target upon which said aiming elements may be simultaneously directed.

48. A range finder comprising a plurality of aiming elements arranged to be separately oscillated and indicating means comprising three cooperating indicating elements two of which are arranged to be oscillated by and in accordance with the oscillation of two of said aiming elements respectively about parallel axes and the third of which is arranged to be oscillated by and in accordance with the oscillation in altitude of one of said aiming elements and in such a manner as to cooperate with the other indicating elements to point out a measurement with respect to a target upon which said aiming elements may be simultaneously directed.

49. A range finder comprising a plurality of aiming elements arranged to be separately oscillated and indicating means comprising three cooperating indicating elements two of which are arranged to be oscillated by and in accordance with the oscillation of two of said aiming elements respectively and the third of which is arranged to be oscillated by and in accordance with the oscillation in altitude of one of said aiming elements and in such a manner as to cooperate with the other indicating elements to point out a measurement with respect to a target upon which said aiming elements may be simultaneously directed, said third indicating element being provided with a surface formed by the rotation of a straight line about the axis of oscillation of said third indicating element and said surface being provided with a series of graduations corresponding to measurements respecting a target upon which said aiming elements may be directed.

50. A range finder comprising a plurality of aiming elements arranged to be separately oscillated and indicating means comprising three cooperating indicating elements two of which are arranged to be oscillated by and in accordance with the oscillation of two of said aiming elements respectively and the third of which is arranged to be oscillated by and in accordance with the oscillation in altitude of one of said aiming elements and in such a manner as to cooperate with the other indicating elements to point out a measurement with respect to a target upon which said aiming elements may be simultaneously directed, two of said indicating elements being arranged to swing about parallel axes and one of said two indicating elements being carried by the other.

51. A range finder comprising a plurality of aiming elements arranged to be separately oscillated and indicating means comprising three cooperating indicating elements two of which are arranged to be oscillated by and in accordance with the oscillation of two of said aiming elements respectively and the third of which is arranged to be oscillated by and in accordance with the oscillation in altitude of one of said aiming elements and in such a manner as to cooperate with the other indicating elements to point out a measurement with respect to a target upon which said aiming elements may be simultaneously directed, two of said indicating elements being arranged to swing about parallel axes and one of said two indicating elements being carried by the other, and the third one of said indicating elements being arranged to oscillate about a fixed axis which intersects the said axis of one of the other indicating elements.

Signed at New York, in the county of New York, this 17th day of June A. D., 1916.

JOHN HAYS HAMMOND, Jr.
HENRY L. F. BUSWELL.